United States Patent
Artemiev et al.

(10) Patent No.: US 10,816,486 B2
(45) Date of Patent: Oct. 27, 2020

(54) MULTILAYER TARGETS FOR CALIBRATION AND ALIGNMENT OF X-RAY BASED MEASUREMENT SYSTEMS

(71) Applicant: KLA-Tencor Corporation, Milpitas, CA (US)

(72) Inventors: Nikolay Artemiev, Berkeley, CA (US); Antonio Gellineau, Santa Clara, CA (US); Alexander Bykanov, Escondido, CA (US); Alexander Kuznetsov, Austin, TX (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/364,163

(22) Filed: Mar. 25, 2019

(65) Prior Publication Data
US 2019/0302039 A1    Oct. 3, 2019

Related U.S. Application Data

(60) Provisional application No. 62/649,131, filed on Mar. 28, 2018.

(51) Int. Cl.
*G01N 23/207*    (2018.01)
*G01N 23/20008*    (2018.01)

(52) U.S. Cl.
CPC ..... *G01N 23/20008* (2013.01); *G01N 23/207* (2013.01); *G01N 2223/303* (2013.01)

(58) Field of Classification Search
CPC ............. G01N 23/00; G01N 23/20008; G01N 23/207; G01N 23/20; G01N 2223/303; A61B 6/0492; A61B 6/08; A61B 6/587
USPC .......................................... 378/70, 205, 207
See application file for complete search history.

(56) References Cited

U.S. PATENT DOCUMENTS

| | | |
|---|---|---|
| 5,608,526 A | 3/1997 | Piwonka-Corle et al. |
| 5,859,424 A | 1/1999 | Norton et al. |
| 6,023,338 A | 2/2000 | Bareket |
| 6,389,100 B1 | 5/2002 | Verman et al. |
| 6,429,943 B1 | 8/2002 | Opsal et al. |

(Continued)

OTHER PUBLICATIONS

International Search Report dated Jul. 11, 2019, for PCT Application No. PCT/US2019/024437 filed on Mar. 27, 2019 by KLA-Tencor Corporation, 3 pages.

*Primary Examiner* — Jurie Yun
(74) *Attorney, Agent, or Firm* — Spano Law Group; Joseph S. Spano

(57) ABSTRACT

Multilayer targets enabling fast and accurate, absolute calibration and alignment of X-ray based measurement systems are described herein. The multilayer calibration targets have very high diffraction efficiency and are manufactured using fast, low cost production techniques. Each target includes a multilayer structure built up with pairs of X-ray transparent and X-ray absorbing materials. The layers of the multilayer target structure is oriented parallel to an incident X-ray beam. Measured diffraction patterns indicate misalignment in position and orientation between the incident X-Ray beam and the multilayer target. In another aspect, a composite multilayer target includes at least two multilayer structures arranged adjacent one another along a direction aligned with the incident X-ray beam, adjacent one another along a direction perpendicular to the incident X-ray beam, or a combination thereof. In some embodiments, the multilayer structures are spatially separated from one another by a gap distance.

28 Claims, 17 Drawing Sheets

(56) References Cited

U.S. PATENT DOCUMENTS

| | | |
|---|---|---|
| 6,716,646 B1 | 4/2004 | Wright et al. |
| 6,778,275 B2 | 8/2004 | Bowes |
| 6,787,773 B1 | 9/2004 | Lee |
| 6,992,764 B1 | 1/2006 | Yang et al. |
| 7,242,477 B2 | 7/2007 | Mieher et al. |
| 7,302,034 B2 | 11/2007 | Grodzins |
| 7,321,426 B1 | 1/2008 | Poslavsky et al. |
| 7,406,153 B2 | 7/2008 | Berman |
| 7,478,019 B2 | 1/2009 | Zangooie et al. |
| 7,626,702 B2 | 12/2009 | Ausschnitt et al. |
| 7,656,528 B2 | 2/2010 | Abdulhalim et al. |
| 7,826,071 B2 | 11/2010 | Shchegrov et al. |
| 7,842,933 B2 | 11/2010 | Shur et al. |
| 7,873,585 B2 | 1/2011 | Izikson |
| 7,929,667 B1 | 4/2011 | Zhuang et al. |
| 7,933,026 B2 | 4/2011 | Opsal et al. |
| 8,068,662 B2 | 11/2011 | Zhang et al. |
| 8,138,498 B2 | 3/2012 | Ghinovker |
| 2003/0021465 A1 | 1/2003 | Adel et al. |
| 2007/0221842 A1 | 9/2007 | Morokuma et al. |
| 2008/0137810 A1 | 6/2008 | Liu et al. |
| 2009/0152463 A1 | 6/2009 | Toyoda et al. |
| 2009/0279090 A1 | 11/2009 | Wolf et al. |
| 2010/0073690 A1 | 3/2010 | Taylor |
| 2011/0266440 A1 | 11/2011 | Boughorbel et al. |
| 2012/0292502 A1 | 11/2012 | Langer et al. |
| 2013/0208279 A1 | 8/2013 | Smith |
| 2013/0304424 A1 | 11/2013 | Bakeman et al. |
| 2014/0019097 A1 | 1/2014 | Bakeman et al. |
| 2014/0111791 A1 | 4/2014 | Manassen et al. |
| 2014/0172394 A1 | 6/2014 | Kuznetsov et al. |
| 2014/0222380 A1 | 8/2014 | Kuznetsov et al. |
| 2014/0297211 A1 | 10/2014 | Pandev et al. |
| 2015/0110249 A1 | 4/2015 | Bakeman et al. |
| 2015/0117610 A1 | 4/2015 | Veldman et al. |
| 2015/0204664 A1 | 7/2015 | Bringoltz et al. |
| 2015/0300965 A1 | 10/2015 | Sezginer et al. |
| 2016/0202193 A1 | 7/2016 | Hench et al. |
| 2016/0320319 A1 | 11/2016 | Hench et al. |
| 2017/0167862 A1 | 6/2017 | Dziura et al. |
| 2017/0307548 A1 | 10/2017 | Bykanov et al. |
| 2018/0106735 A1 | 4/2018 | Gellineau et al. |
| 2018/0113084 A1 | 4/2018 | Hench et al. |
| 2018/0328868 A1 | 11/2018 | Bykanov et al. |

MULTILAYER TARGETS FOR CALIBRATION AND ALIGNMENT OF X-RAY BASED MEASUREMENT SYSTEMS

CROSS REFERENCE TO RELATED APPLICATION

The present application for patent claims priority under 35 U.S.C. § 119 from U.S. provisional patent application Ser. No. 62/649,131, filed Mar. 28, 2018, the subject matter of which is incorporated herein by reference in its entirety.

TECHNICAL FIELD

The described embodiments relate to X-ray metrology systems and methods, and more particularly to methods and systems for improved measurement accuracy.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures.

Traditionally, scatterometry critical dimension measurements are performed on targets consisting of thin films and/or repeated periodic structures. During device fabrication, these films and periodic structures typically represent the actual device geometry and material structure or an intermediate design. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled with available measurements.

In one example, longer wavelengths (e.g. near infrared) have been employed in an attempt to overcome penetration issues for 3D FLASH devices that utilize polysilicon as one of the alternating materials in the stack. However, the mirror like structure of 3D FLASH intrinsically causes decreasing light intensity as the illumination propagates deeper into the film stack. This causes sensitivity loss and correlation issues at depth. In this scenario, SCD is only able to successfully extract a reduced set of metrology dimensions with high sensitivity and low correlation.

In another example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. However, these approaches have not reliably overcome fundamental challenges associated with measurement of many advanced targets (e.g., complex 3D structures, structures smaller than 10 nm, structures employing opaque materials) and measurement applications (e.g., line edge roughness and line width roughness measurements).

Atomic force microscopes (AFM) and scanning-tunneling microscopes (STM) are able to achieve atomic resolution, but they can only probe the surface of the specimen. In addition, AFM and STM microscopes require long scanning times. Scanning electron microscopes (SEM) achieve intermediate resolution levels, but are unable to penetrate structures to sufficient depth. Thus, high-aspect ratio holes are not characterized well. In addition, the required charging of the specimen has an adverse effect on imaging performance. X-ray reflectometers also suffer from penetration issues that limit their effectiveness when measuring high aspect ratio structures.

To overcome penetration depth issues, traditional imaging techniques such as TEM, SEM etc., are employed with destructive sample preparation techniques such as focused ion beam (FIB) machining, ion milling, blanket or selective etching, etc. For example, transmission electron microscopes (TEM) achieve high resolution levels and are able to probe arbitrary depths, but TEM requires destructive sectioning of the specimen. Several iterations of material removal and measurement generally provide the information required to measure the critical metrology parameters throughout a three dimensional structure. But, these techniques require sample destruction and lengthy process times. The complexity and time to complete these types of measurements introduces large inaccuracies due to drift of etching and metrology steps. In addition, these techniques require numerous iterations which introduce registration errors.

Transmission, Small-Angle X-ray Scatterometry (T-SAXS) systems employing photon at a hard X-ray energy level (>15 keV) have shown promise to address challenging measurement applications. Various aspects of the application of SAXS technology to the measurement of critical dimensions (CD-SAXS) and overlay (OVL-SAXS) are described in 1) U.S. Pat. No. 7,929,667 to Zhuang and Fielden, entitled "High-brightness X-ray metrology," 2) U.S. Patent Publication No. 2014/0019097 by Bakeman, Shchegrov, Zhao, and Tan, entitled "Model Building And Analysis Engine For Combined X-ray And Optical Metrology," 3) U.S. Patent Publication No. 2015/0117610 by Veldman, Bakeman, Shchegrov, and Mieher, entitled "Methods and Apparatus For Measuring Semiconductor Device Overlay Using X-ray Metrology," 4) U.S. Patent Publication No. 2016/0202193 by Hench, Shchegrov, and Bakeman, entitled "Measurement System Optimization For X-ray Based Metrology," 5) U.S. Patent Publication No. 2017/0167862 by Dziura, Gellineau, and Shchegrov, entitled "X-ray Metrology For High Aspect Ratio Structures," and 6) U.S. Patent Publication No. 2018/0106735 by Gellineau, Dziura, Hench, Veldman, and Zalubovsky, entitled "Full Beam Metrology for X-ray Scatterometry Systems." The aforementioned patent documents are assigned to KLA-Tencor Corporation, Milpitas, Calif. (USA).

SAXS has also been applied to the characterization of materials and other non-semiconductor related applications. Exemplary systems have been commercialized by several companies, including Xenocs SAS (www.xenocs.com), Bruker Corporation (www.bruker.com), and Rigaku Corporation (www.rigaku.com/en).

Research on CD-SAXS metrology of semiconductor structures is also described in scientific literature. Most research groups have employed high-brightness X-ray synchrotron sources which are not suitable for use in a semiconductor fabrication facility due to their immense size, cost, etc. One example of such a system is described in the article entitled "Intercomparison between optical and X-ray scatterometry measurements of FinFET structures" by Lemaillet, Germer, Kline et al., Proc. SPIE, v.8681, p. 86810Q (2013). More recently, a group at the National Institute of Standards and Technology (NIST) has initiated research employing compact and bright X-ray sources similar those described in U.S. Pat. No. 7,929,667. This research is described in an article entitled "X-ray scattering critical dimensional metrology using a compact X-ray source for next generation semiconductor devices," J. Micro/Nanolith. MEMS MOEMS 16(1), 014001 (January-March 2017).

The interaction of the X-ray beam with the target must be calibrated and aligned with the metrology system to ensure effective measurements. Exemplary characterizations include precisely locating the peak intensity of the X-ray beam on the target and identifying the boundaries of the X-ray beam such that only a certain percentage of beam flux lies outside of the boundaries. Exemplary alignments include alignment of the X-ray beam with an optical vision system, alignment of the X-ray beam with specific mechanical features of the tool (e.g., axes of wafer rotation, etc.), etc.

In general, a wafer is navigated in the path of the X-ray beam based on optical measurements of alignment markers disposed throughout the wafer by an optical microscope. To ensure that a particular target is precisely navigated with respect to the X-ray beam, the beam profile needs to be measured in the coordinates of the optical microscope employed to measure the markers.

Current techniques for calibration and alignment of SAXS tools suffer from very long measurement times and their accuracy strongly depends on the accuracy of prepared targets.

Methods for calibration and alignment of CD-SAXS tools based on knife edges are described in U.S. Patent Publication No. 2018/0113084, the content of which is incorporated herein by reference in its entirety. Calibration and alignment based on knife edges is an intrinsically indirect method of alignment of a sample stage with a probe beam. Alignment time can be lengthy if the number of required measurement iterations becomes excessive. In addition, accuracy is limited by the semi-transparency of the knife edge and also strongly depends on manufacturing accuracy of the knife edge.

In some examples, an optical microscope is aligned with a knife edge and the knife edge is aligned with the X-ray beam. Characterization of an X-ray beam with traditional knife edges is complicated due to the semi-transparency of the knife material illuminated by X-ray radiation near the edges of the knife edge. For example, tungsten has a beam attenuation length of about 8.4 micrometers when illuminated by photons having an energy level of 20 keV. At this length, the transmission drops by factor of $-1/e$ (e=2.718). For a knife edge shaped at an angle of 30 degrees, the length of the wedge corresponding to a height of 8.4 micrometer is approximately 14.5 micrometers. This simple estimate of the uncertainty of a knife edge position during an X-ray beam scan illustrates that when the required alignment accuracy is less than a few micrometers (e.g., less than 10 micrometers), the semi-transparency of the knife edge is limiting.

In some other examples, the X-ray beam profile is characterized by a high resolution X-ray camera located at some point (e.g., a focal spot of the focusing optics) with respect to the X-ray beam. In these examples, the beam profile is measured with the high resolution X-ray camera, and the measured coordinates of the beam are transferred to the optical microscope employed to navigate the wafer in the path of the X-ray beam. Unfortunately, errors associated with transferring the measured coordinates from the X-ray camera to the optical microscope are significant and exceed the required accuracy of navigation.

Furthermore, characterization of the X-ray beam by an X-ray camera or knife edges are intrinsically indirect and do not provide quantitative data on photon flux incident on the target as well as photon contamination of neighboring regions.

Methods for calibration and alignment of CD-SAXS tools based on diffraction targets are described in U.S. Patent Publication No. 2018/0328868, the content of which is incorporated herein by reference in its entirety. Diffraction targets manufactured by traditional semiconductor fabrication techniques suffer from low contrast. In addition, fabrication lead times are usually very long and costly. A wafer including many targets is very expensive, and any change in target design or target parameter values requires another expensive and long lead time purchase.

Multi-layer structures have been employed as focusing X-ray optical elements. Methods of manufacture and use of multilayer structures for hard X-ray focusing are described in U.S. Patent Publication No. 2008/0137810, U.S. Pat. No. 6,389,100, German Patent No. DE102013005845, and T. Grap, F. Riederer, C. Gupta and J. Knoch, "Buried multi-gate InAs-nanowire FETs," 2017 47th European Solid-State Device Research Conference (ESSDERC), Leuven, 2017, pp. 82-85, the contents of each of these references are incorporated herein by reference in their entireties.

Free-standing multilayer targets have also been employed for measurements of modulation transfer functions of soft X-ray microscopes as described in the article entitled, "Binary pseudo-random patterned structures for modulation transfer function calibration and resolution characterization of a full-field transmission soft X-ray microscope," by V. V. Yashchuk et al., Review of Scientific Instruments 86, 123702 (2015), the content of which is incorporated herein by reference in its entirety.

Methods of calibration of SAXS tools employing scattering samples and a silver behenate powder diffraction sample are described in "X-ray Powder Diffraction analysis of Silver Behenate, a Possible Low-angle Diffraction Standard," by T. C. Huang et al., J. Appl. Cryst. 26, 180-184 (1993) and "The Absolute Calibration of a Small-Angle Scattering Instrument with a Laboratory X-ray Source," by Lixin Fan et al., Journal of Physics: Conference Series 247 (2010) 012005, the contents of each of these references are incorporated herein by reference in their entireties.

Unfortunately, silver behenate targets require very long exposure times and can only be used to perform sample-to-detector distance measurements. To reduce exposure time, a thicker sample must be used, which increases uncertainty of the distance measurement. Glassy carbon and other diffuse scattering targets also require very long exposure times. Furthermore, measurement results depend strongly on sample preparation accuracy (e.g., geometrical dimensions of the sample) and sample purity.

Future metrology applications present challenges for metrology due to increasingly small resolution requirements, multi-parameter correlation, increasingly complex geometric structures including high aspect ratio structures, and increasing use of opaque materials. Existing methods of X-ray tool alignment and target navigation are limited to an accuracy of approximately 10-20 micrometers. These methods are not able to position and measure metrology targets of small sizes (~50 micrometers) in an X-ray beam with sufficient accuracy for semiconductor metrology applications. Thus, methods and systems for improved alignment and calibration of X-ray beams in X-ray based metrology systems are desired to meet the placement requirements of advanced manufacturing nodes.

SUMMARY

Multilayer targets enabling fast and accurate, absolute calibration and alignment of X-ray based measurement systems are described herein. The multilayer calibration targets have very high diffraction efficiency and are manufactured using fast, low cost production techniques.

Each target includes a multilayer structure built up with pairs of X-ray transparent and X-ray absorbing materials. The thick, multilayer target structure is set in a transmission arrangement (i.e., Laue geometry) such that the material layers are oriented parallel to the incident X-ray beam. X-rays diffract on the periodic structure of the target. The total thickness of the multilayer structure (i.e., the number of pairs of layers multiplied by the multilayer period) in the direction perpendicular to each layer defines the height of the target. The width of the target may have any size up to the length of the substrate upon which the multilayered structure is manufactured (e.g., a few centimeters).

Alignment and calibration performance of multilayer targets as described herein does not depend on the accuracy of the multilayer target geometrical parameters (i.e., height, width, depth). Furthermore, alignment and calibration performance of multilayer targets as described herein does not depend on the accuracy of the method used for target extraction from the multilayer coating initially applied to a substrate. Possible debris and roughness at the periphery of the target does not decrease alignment and calibration accuracy.

In some embodiments, multilayer targets are employed to align and calibrate a transmission, small angle X-ray scatterometry (T-SAXS) metrology system. Practical T-SAXS measurements in a semiconductor manufacturing environment require measurements over a large range of angles of incidence and azimuth with respect to the surface of a specimen (e.g., semiconductor wafer) with a small beam spot size (e.g., less than 50 micrometers across the effective illumination spot). Accurate positioning of the wafer and characterization of the beam size and shape are required to achieve small measurement box size. In addition, calibrations that accurately locate the probe beam on the desired target area on the surface of a semiconductor wafer over the full range of incidence and azimuth angles are presented herein. This enables precise navigation of the wafer required to measure small box size metrology targets (e.g., metrology targets located in scribe lines having dimensions of 50 micrometer or less).

By way of non-limiting example, the multilayer targets described herein enable the following alignment and calibration measurements in a SAXS metrology tool: 1) Direct measurement of flux through the measurement box; 2) Direct measurement of photon leakage around a measurement box size; 3) Alignment of sample to metrology stage in all degrees of freedom; 4) Alignment of sample to incident X-ray beam in all degrees of freedom; 5) Calibration of incident X-ray beam to wafer stage angular alignment; and 6) Distance from target to detector.

In some embodiments, multilayer calibration targets are manufactured using a combination of standard optical multilayer deposition and dicing techniques. This enables fast and low cost production for a wide range of applications.

In other embodiments, multilayer calibration targets are manufactured using standard semiconductor fabrication techniques. In some embodiments, a multiple layer stack is deposited on the sides of a vertical structure fabricated on a semiconductor wafer.

In a further aspect, optical markers are fabricated on a surface of a multilayer target that is normal to the incident X-ray beam. The optical markers may be fabricated onto the multilayer target by etching, ion milling, laser scribing, etc. The optical markers enable alignment of the multilayer target with one or more optical microscopes used further for wafer navigation on the X-ray based scatterometry tool.

In another aspect, the multilayer target is oriented such that the layers of the multilayer target are parallel to the incident X-ray beam.

In another aspect, the distance between a multilayer target and a detector is measured based on the spatial separation among diffraction orders.

In another aspect, a multilayer target is translated in a direction parallel or perpendicular to the layers of the multilayer target and perpendicular to the incident X-ray beam to align the incident X-ray beam with the center of the multilayer target.

In another aspect, a multilayer target is rotated about an axis of rotation perpendicular to the layers of the multilayer target and perpendicular to the incident X-ray beam to locate the axis of rotation of the wafer stage with respect to the incident X-ray beam and the multilayer target.

In another aspect, a composite multilayer target is provided that includes at least two multilayer structures arranged adjacent one another along a direction aligned with the incident X-ray beam, adjacent one another along a direction perpendicular to the incident X-ray beam, or a combination thereof. In this manner, multiple, multilayer targets are combined to form special calibration and alignment targets diffracting different parts of the incident X-ray beam with different diffraction angles and across different diffraction planes.

In some embodiments, a composite, multilayer target includes two multilayer structures mounted to a substrate in a common plane perpendicular to the incident X-ray beam. In addition, the multilayer structures are spatially separated from one another by a gap distance. These composite, multilayer targets may be employed to measure flux passed through the gap of the composite, multilayer target and photon loss associated with photons incident on a composite, multilayer target outside the gap.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Figure 1:
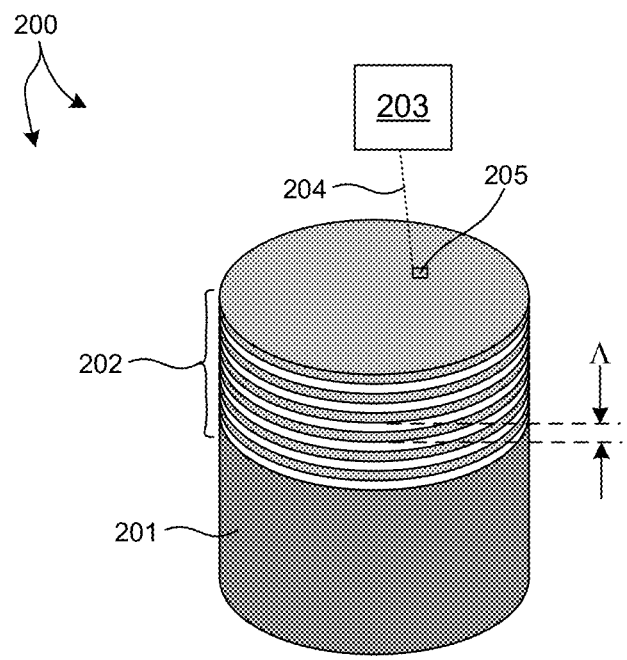
FIG. 1 is a diagram illustrative of a multilayer structure deposited on a superpolished silicon substrate.

Reference will now be made in detail to background examples and some embodiments of the invention, examples of which are illustrated in the accompanying drawings.

Multilayer targets that enable fast and accurate, absolute calibration and alignment of X-ray based metrology and inspection tools are described herein. The multilayer calibration targets have very high diffraction efficiency and are manufactured using a combination of standard optical multilayer deposition and dicing techniques, enabling fast and low cost production for a wide range of applications.

Each target includes a multilayer structure built up with pairs of X-ray transparent and X-ray absorbing materials (e.g., silicon-tungsten material pairs, silicon-molybdenum material pairs, etc.). The thick multilayer target structure is set in a transmission arrangement (i.e., Laue geometry) such that the material layers are oriented parallel to the incident X-ray beam. As such, each layer of a multilayer target is oriented in a direction nominally orthogonal to the wafer plane. X-rays diffract on the periodic structure of the target. The length of the layers oriented parallel to the incident X-ray beam (i.e., the depth of the multilayer structure penetrated by the incident X-ray beam) defines the diffraction efficiency. In principle, the depth of the multilayer structure penetrated by the incident X-ray beam can be any length. Thus, a multilayer target manufactured in this manner may be designed to have any desired diffraction efficiency up to one hundred percent. In practice, this length ranges from a few microns (e.g., three microns or more) to the length of the substrate upon which the multilayered structure is manufactured (e.g., a few centimeters). The period of the multilayer structure defines the diffraction angle. The total thickness of the multilayer structure (i.e., the number of pairs of layers multiplied by the multilayer period) in the direction perpendicular to each layer defines the height of the target. The width of the target may have any size up to the length of the substrate upon which the multilayered structure is manufactured (e.g., a few centimeters).

The accuracy of alignment and calibration of an X-ray based metrology or inspection tool depends only on the accuracy of initial characterization of the multilayer structure, which may be performed with very high precision (e.g., fraction of a nanometer). As a result, multilayer targets as described herein enable fast initial and routine calibration and alignment of X-ray based metrology and inspection tools (e.g., a critical dimension small angle X-ray scatterometry (CD-SAXS)) with accuracy of a few micrometers (e.g., accuracy less than five microns).

Alignment and calibration performance of multilayer targets as described herein does not depend on the accuracy of the multilayer target geometrical parameters (i.e., height, width, depth). Furthermore, alignment and calibration performance of multilayer targets as described herein does not depend on the accuracy of the method used for target extraction from the multilayer coating initially applied to a substrate. Possible debris and roughness at the periphery of the target does not decrease alignment and calibration accuracy.

The high diffraction efficiency of the multilayer targets described herein enables very short measurement exposure times, which in turn, enables much faster calibration and alignment of X-ray based metrology and inspection tools.

In some embodiments, multilayer targets are employed to align and calibrate a transmission, small angle X-ray scatterometry (T-SAXS) metrology system. Practical T-SAXS measurements in a semiconductor manufacturing environment require measurements over a large range of angles of incidence and azimuth with respect to the surface of a specimen (e.g., semiconductor wafer) with a small beam spot size (e.g., less than 50 micrometers across the effective illumination spot). Accurate positioning of the wafer and characterization of the beam size and shape are required to achieve small measurement box size. In addition, calibrations that accurately locate the probe beam on the desired target area on the surface of a semiconductor wafer over the full range of incidence and azimuth angles are presented herein. This enables precise navigation of the wafer required to measure small box size metrology targets (e.g., metrology targets located in scribe lines having dimensions of 50 micrometer or less).

By way of non-limiting example, the multilayer targets described herein enable the following alignment and calibration measurements in a SAXS metrology tool: 1) Direct measurement of flux through the measurement box; 2) Direct measurement of photon leakage around a measurement box size; 3) Alignment of sample to metrology stage in all degrees of freedom; 4) Alignment of sample to incident X-ray beam in all degrees of freedom; 5) Calibration of incident X-ray beam to wafer stage angular alignment; and 6) Distance from target to detector.

In one aspect, the multilayer calibration targets are manufactured using a combination of standard optical multilayer deposition and dicing techniques. This enables fast and low cost production for a wide range of applications. Fast target manufacturing (e.g., few days, rather than weeks) enables rapid improvement of calibration target design and development of calibration and alignment methods. Furthermore, calibration and alignment targets of different sizes to match customer specific applications may be quickly realized. Multilayer coating manufacturing technology is very well developed. Stability and accuracy of multilayer parameters is very high. As a result, the actual performance of the multilayer structures described herein corresponds well with expectations.

FIG. 1 is a diagram illustrative of a multilayer sample 200 including a multilayer structure 202 on a silicon substrate 201. Silicon substrate 201 is a superpolished, flat substrate. Multilayer structure 202 includes alternating layers of X-ray transparent and X-ray absorbing materials (e.g., silicon-tungsten material pairs, silicon-molybdenum material pairs, etc.). The thickness of the X-ray transparent material layers may be the same or different from the thickness of the X-ray absorbing material layers. However, each repeatedly stacked material pair is substantially identical in dimension and material composition. In other words, each of the stacked material pairs includes the same thickness of X-ray transparent material and the same thickness X-ray absorbing material. The resulting periodicity of the structure is characterized by the thickness, A, of a single material pair. The total thickness of the multilayer coating is equal to the height of the target. The period of the multilayer coating is defined by the desired diffraction order separation and the X-ray photon energy of the incident X-ray beam employed by the X-ray based metrology system. In general, the period of the multilayer coating may be as small as 2.5 nanometers. However, in practice, a reasonable number of diffraction orders on the detector with reasonably good spatial separation for typical X-ray illumination beam energy is achieved with a multilayer period in a range from 10 nanometers to 100 nanometers. A smaller period increases the aspect ratio of the target (i.e., the ratio between the depth of the multilayer target and the period). Alignment of the target with the incident beam becomes increasingly difficult as the aspect ratio increases. For example, a one milliradian angle between the axis of the incident X-ray beam and the diffracting planes of a target with a 10 nanometer period and 10 micrometer depth would result in considerable loss of intensity of the diffracted orders. As a result, it may be advantageous to select a multilayer period as large as possible while still achieving a desired diffraction order separation for a given X-ray photon energy of the incident X-ray beam.

As depicted in FIG. 1, a small multilayer segment 205 is cut out of the multilayer sample 200 by a focused ion beam (FIB) etching. A focused ion beam tool 203 delivers a focused ion beam 204 to the multilayer sample and separates multilayer segment 205 from the multilayer sample with the desired size (i.e., the desired width, depth, and height). In general, the height of the target is limited by the height of the multilayer coating, which is typically 100 micrometers, or less. However, in general, the depth of the target (length along the beam) and the width of the target across the beam may be any size less than the diameter of substrate 201.

Figure 2:
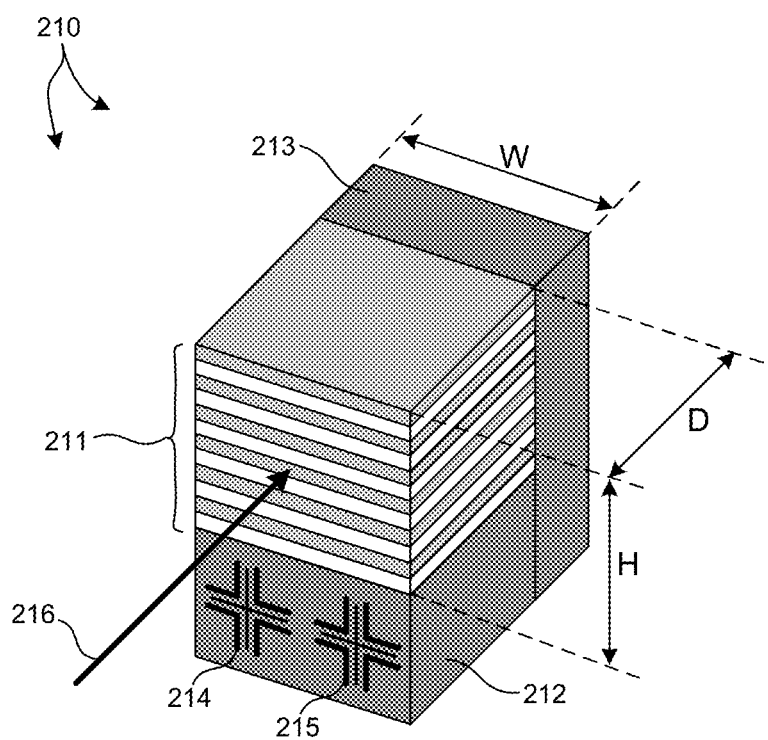
FIG. 2 is a diagram illustrative of a multilayer target assembled from a multilayer segment separated from the multilayer sample depicted in FIG. 1.

FIG. 2 depicts a multilayer target 210 assembled from the multilayer segment 205 separated from the multilayer sample depicted in FIG. 1. The depth, D, of the multilayer target 210 along the incident X-ray beam defines the diffraction efficiency. The height, H, of the multilayer structure 211 is the thickness of the multilayer structure 202. The width, W, of the multilayer target 210 is the width of the separated target 205. In one example, a multilayer structure has a height, H, of 50 micrometers, a width, W, of 50 micrometers, and a depth, D, of 5 micrometers.

In the embodiment depicted in FIG. 2, multilayer target 210 includes multilayer structure 211 supported by mother substrate 212 extracted with multilayer structure 211 as part of multilayer segment 205. In addition, multilayer target 210 includes substrate 213 attached to multilayer structure 211 to provide additional structural support and facilitate mounting to a metrology system to be calibrated. Substrates 212 and 213 are fabricated from materials that do not diffract X-rays (e.g., silicon). In some other embodiments of multilayer targets, either or both substrates 212 and 213 are not present. In one embodiment, a multilayer target only includes multilayer structure 211. In these embodiments, the multilayer target is a freestanding multilayer structure. A multilayer target with an aspect ratio (i.e., H/D) of about 10 is expected to be a stable, free-standing structure. A free-standing multilayer structure maintains its shape without having to be attached to another supporting structure. In this manner, a multilayer target may include multilayer structure 211, alone, without support from another substrate. Alternatively, multilayer structure 211 may be attached to a X-ray transparent substrate 213, may remain attached to a portion 212 of its mother substrate (i.e., substrate 201 depicted in FIG. 1), or both, as depicted in FIG. 2. In this manner, the multilayer structure 211 may be detached from its silicon substrate or remain attached for ease of handling.

As depicted in FIG. 2, incident X-ray beam 216 is incident on a 50 micrometer by 50 micrometer wall of the multilayer structure 211. The X-ray beam propagates through multilayer structure 211 over the five micrometer depth of multilayer structure 211. In general, the size of the multilayer target 210 may be any suitable size. In some examples, multilayer target 210 is as small as 10 micrometers. In some examples, multilayer target 210 is sized to fit within a standard scribe line target (e.g., 50 micrometers).

A typical superpolished silicon substrate, such as substrate 201 depicted in FIG. 1, is one inch in diameter and multilayer structure 202 is fabricated over the entire area. Assuming the characteristic dimension of extracted multilayer targets 50 micrometers to 100 micrometers, a single substrate will yield a few thousand targets even after accounting for area lost around each target due to the FIB process for target extraction.

All targets extracted from a particular manufacturing sample will have substantially identical multilayer parameters such as period, material composition, roughness, absorber to period ratio, and interdiffusion layer thickness. For initial characterization of these properties only a few targets, extracted from different parts of the substrate are thoroughly measured. In general, only a few (e.g., approximately five) targets extracted from one substrate are thoroughly measured to determine actual multilayer period and diffraction efficiency. If all measured targets show the same performance, it is expected that the multilayer parameters are stable across the substrate and all other targets extracted from the sample will be substantially identical. The quality of the wall of each extracted target and debris of the FIB process does not affect the target performance as described herein.

In another aspect, the multilayer calibration targets are manufactured using standard semiconductor fabrication techniques. In some embodiments, a multiple layer stack is deposited on the sides of a vertical structure fabricated on a semiconductor wafer.

Figure 3:
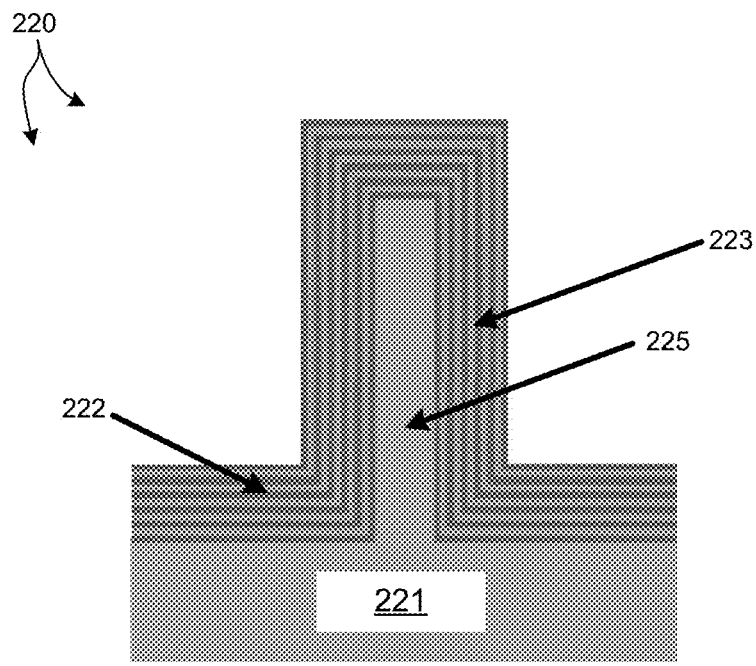
FIG. 3 is a diagram illustrative of a multilayer target including a vertically oriented multilayer structure conformally deposited on the sidewalls of a vertically oriented silicon pillar and a horizontally oriented multilayer structure conformally deposited on a silicon substrate.

FIG. 3 depicts an illustration of a multilayer target 220 including a vertically oriented multilayer structure 223 conformally deposited on the sidewalls of a vertically oriented silicon pillar 225 and a horizontally oriented multilayer structure 222 conformally deposited in the horizontal direction on silicon substrate 221 and the top of vertical pillar 225. Target 220 includes both horizontal and vertical multilayers. Both horizontal and vertical multilayers may be used as a diffracting target structure as described herein.

Figure 4:
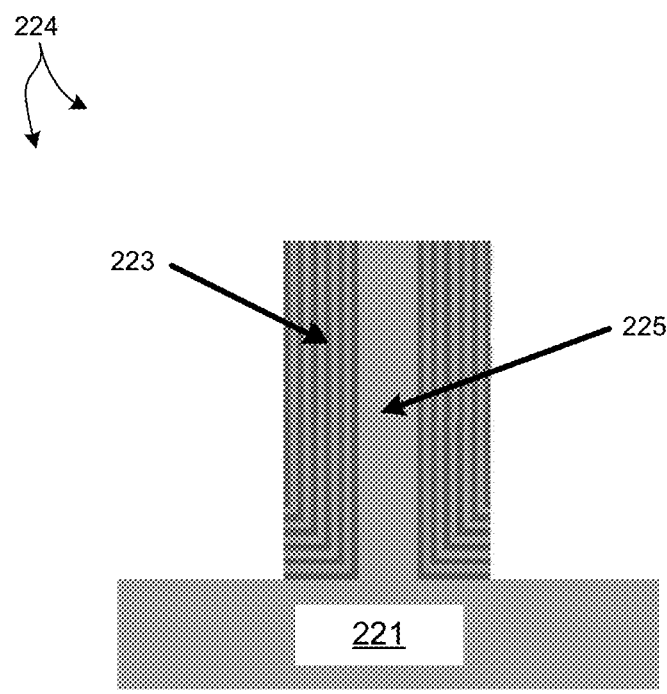
FIG. 4 is a diagram illustrative of a multilayer target including a vertically oriented multilayer structure conformally deposited on the sidewalls of a vertically oriented silicon pillar.

FIG. 4 depicts an illustration of a multilayer target 224 including a vertically oriented multilayer structure 223 conformally deposited on the sidewalls of vertically oriented silicon pillar 225. Multilayer target 224 is multilayer target 220 subjected to an additional directional etching step that removes horizontal multilayer structure 222 from silicon substrate 221. Target 220 includes vertical multilayers that may be used as a diffracting target structure as described herein.

Multilayer calibration targets manufactured using standard semiconductor fabrication techniques, such as targets 220 and 224 may be advantageous because they may be fabricated directly on a semiconductor fabrication wafer without additional cutting, dicing, or mounting steps. Furthermore, these targets are an integral part of the same fabricated semiconductor wafer to be measured by an X-ray based scatterometry system. This simplifies alignment and calibration procedures. In particular, other types of targets (e.g., targets used to validate tool performance), as well as optical alignment marks or other structures useful for tool alignment and calibration may be fabricated on the same wafer.

In another further aspect, optical markers are etched on a surface of a multilayer target on a surface normal to the incident X-ray beam. FIG. 2 depicts optical markers 214 and 215 etched on a surface of substrate 212 that faces incident X-ray beam 216. The optical markers may be etched onto the multilayer target by etching, ion milling, laser scribing, etc. In general, the multilayer target may include optical markers on the surface normal to the incident X-ray beam on the front side, the back side, or both. The optical markers should have sufficiently high contrast for pattern recognition of images obtained with a navigation microscope (e.g., high magnification camera, low magnification camera, or both). The accuracy of the position of the optical markers relative to the edges of the target should be less than one micrometer. In some embodiments, the optical markers are ion milled by a focused ion beam (FIB) machining tool (e.g., FIB tool 203) when the target is extracted from the multilayer sample. The one or more optical markers enables alignment of the multilayer target with one or more optical microscopes used further for wafer navigation on the X-ray based scatterometry tool. In this manner, the position of the incident X-ray beam with respect to the optical navigation camera system is also calibrated via the optically marked multilayer target.

In another aspect, the multilayer target is oriented such that the layers of the multilayer target are parallel to the incident X-ray beam.

Figure 5:
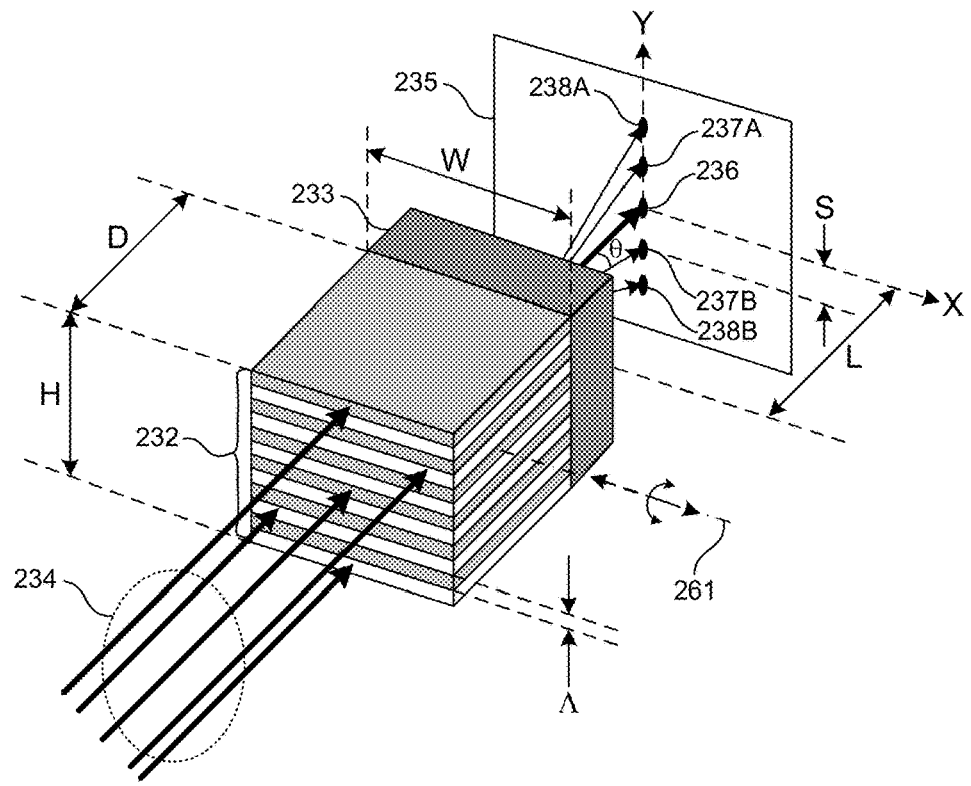
FIG. 5 is a diagram illustrative of an X-ray beam incident on a multilayer target in one embodiment.

FIG. 5 depicts an X-ray beam 234 incident on a multilayer target including multilayer structure 232 mounted to substrate 233. The resulting diffracted orders 236, 237A-B, and 238A-B are detected on detector 235. As depicted in FIG. 5, the layers of multilayer structure 232 are oriented parallel to incident X-ray beam 234 (i.e., parallel to a longitudinal axis of the X-ray beam which is aligned with a direction of propagation of the incident X-ray beam). Furthermore, layers are oriented parallel with the X-axis of the wafer plane projected onto detector 235. The incident X-ray beam 234 is diffracted into a zero order beam, +/−1 order beams, and +/−2 order beams incident on detector 235 at measurement spot 236, measurement spots 237A-B, and measurement spots 238A-B, respectively. As depicted in FIG. 5, multilayer structure 232 diffracts incident beam 234 along the Y-axis of the wafer plane projected onto detector 235.

Multilayer structure 232 is designed with a period to achieve a desired separation of diffraction orders on the detector for a given photon energy of the incident beam. In addition, multilayer structure 232 is designed with a depth, D, to achieve a desired diffraction efficiency or number of diffracted photons detectable at the detector for a given photon energy of the incident beam. The diffraction efficiency is proportional to the square of the length of the structure along the beam and the number of diffracted photons is proportional to the square of the wavelength of the incident beam.

In some embodiments, an X-ray illumination source is employed that provides an X-ray beam with selectable beam energy (i.e., wavelength). In one example, a multi-element anode X-ray illumination source is employed. In these embodiments, the wavelength of the incident X-ray beam is selected to achieve a desired diffraction efficiency and spatial separation of diffraction orders to perform calibration and alignment with maximum speed. For example, softer photons generate diffraction orders with larger spatial separation at the detector.

The aspect ratio of multilayer structure 232 is large (e.g., D/A greater than 50, D/A less than 500). As a result, diffraction efficiency of multilayer structure 232 is very sensitive to the orientation of multilayer structure 232 about an axis 261 perpendicular to the incident X-ray beam 234 and parallel to the structural layers. When structural layers of multilayer structure 232 are perfectly parallel with incident X-ray beam 234, the diffraction efficiency is maximal. Small rotations about axis 261 from perfect alignment cause a rapid decrease in diffraction efficiency. This sensitivity is employed to quickly and accurately align multilayer structure 232, and consequently the wafer stage, with the incident X-ray beam about an axis of rotation aligned with the X-axis in the plane of the wafer projected onto the detector 235 with high accuracy (e.g., alignment of a multilayer structure with respect to an incident X-ray beam within 1 milliradian, or less). In this manner, the zero angle of incidence about the X-axis of rotation in the plane of the wafer is calibrated. For example, for multilayer target with an aspect ratio of 100 (e.g., multilayer period of 100 nanometers and target depth of 10 micrometers along the X-ray beam), the intensity of the measured diffracted beams 237A-B, and 238A-B decreases by many times when the target is tilted by 10 milliradians.

Figure 6:
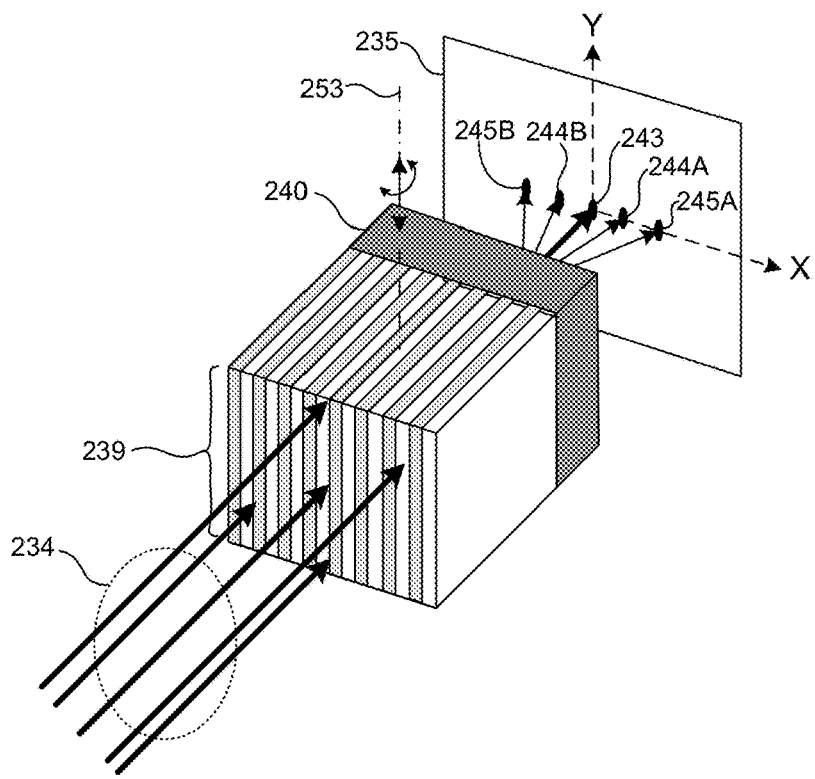
FIG. 6 is a diagram illustrative of an X-ray beam incident on a multilayer target in another embodiment.

FIG. 6 depicts an X-ray beam 234 incident on a multilayer target including multilayer structure 239 mounted to substrate 240. The resulting diffracted orders 243, 244A-B, and 245A-B are detected on detector 235. As depicted in FIG. 6, the layers of multilayer structure 239 are oriented parallel to incident X-ray beam 234. Furthermore, layers are oriented parallel with the Y-axis of the wafer plane projected onto detector 235. The incident X-ray beam 234 is diffracted into a zero order beam, +/−1 order beams, and +/−2 order beams incident on detector 235 at measurement spot 243, measurement spots 244A-B, and measurement spots 245A-B, respectively. As depicted in FIG. 6, multilayer structure 239 diffracts incident beam 234 along the X-axis of the wafer plane projected onto detector 235.

As described with reference to multilayer structure 232 with reference to FIG. 5, multilayer structure 239 is designed with a period to achieve a desired separation of diffraction orders on the detector for a given photon energy of the incident beam. In addition, multilayer structure 239 is designed with a depth, D, to achieve a desired diffraction efficiency or number of diffracted photons detectable at the detector for a given photon energy of the incident beam.

Similarly, the aspect ratio of multilayer structure 239 is large (e.g., D/A greater than 50, D/A less than 500). As a result, diffraction efficiency of multilayer structure 239 is very sensitive to the orientation of multilayer structure 239 about an axis 253 perpendicular to the incident X-ray beam 234 and parallel to the structural layers. When structural layers of multilayer structure 239 are perfectly parallel with incident X-ray beam 234, the diffraction efficiency is maximal. Small rotations about axis 253 from perfect alignment cause a rapid decrease in diffraction efficiency. This sensitivity is employed to quickly and accurately align multilayer structure 239, and consequently the wafer stage, with the incident X-ray beam about an axis of rotation aligned with the Y-axis in the plane of the wafer projected onto the detector 235 with high accuracy (e.g., alignment of a multilayer structure with respect to an incident X-ray beam within 1 milliradian, or less). In this manner, the zero angle of incidence about the Y-axis of rotation in the plane of the wafer is calibrated. For example, for multilayer target with an aspect ratio of 100 (e.g., multilayer period of 100 nanometers and target depth of 10 micrometers along the X-ray beam), the intensity of the measured diffracted beams 244A-B, and 245A-B decreases by many times when the target is tilted by 10 milliradians.

In the embodiments depicted in FIGS. 5 and 6 two different multilayer targets are employed by a metrology system to calibrate angle of incidence in two orthogonal directions. However, in general, a single multilayer target may be employed to calibrate angle of incidence in two orthogonal directions by simply rotating the multilayer target 90 degrees between each calibration.

In another aspect, the distance between a multilayer target and a detector is measured based on the spatial separation among diffraction orders.

As described with reference to multilayer structure 232 with reference to FIG. 5, multilayer structure 239 is designed with a spatial period, A, and is illuminated with X-ray radiation characterized by a particular wavelength, λ. Assuming small angle scattering, each non-zero diffraction order is angularly displaced from the zero diffraction order by an angle nθ, where n is the diffraction order. The angular displacement is a function of the spatial period and the illumination wavelength as follows: $\sin(\theta)=\lambda/\Lambda$. Furthermore, distance from the target to the detector, L, is a function of the spatial separation between the first and zero diffraction orders, S, at the detector as follows: $L=S/\sin(\theta)$. Thus, the distance from the target to the detector, L, may be expressed as: $L=S*\Lambda/\lambda$, where S is measured at the detector and λ and Λ are very accurately known system parameters.

Figure 17:
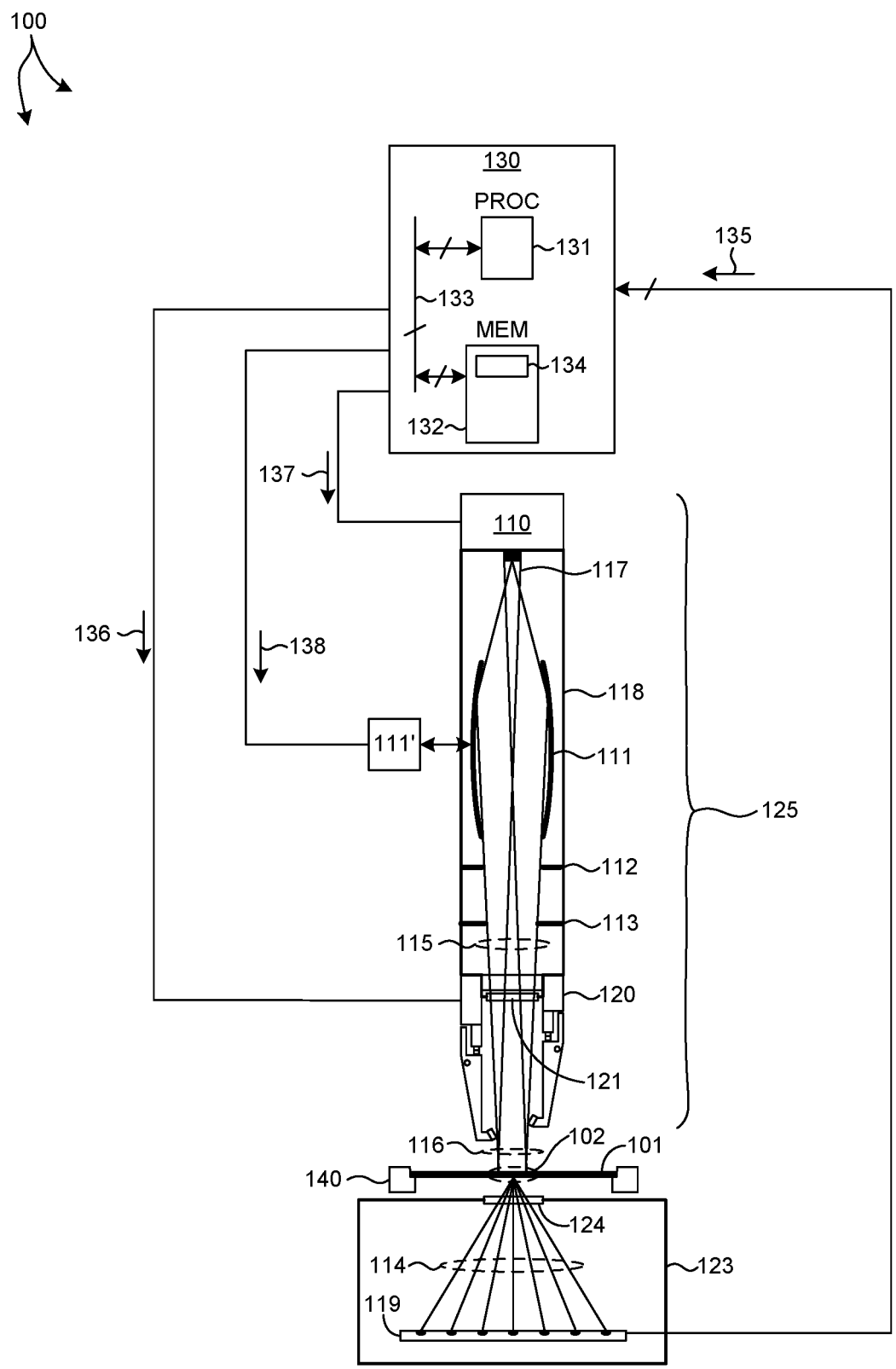
FIG. 17 is a diagram illustrative of a metrology system 100 configured to perform calibration of various system parameters using a multilayer calibration target in accordance with the methods described herein.

In this manner, computing system 130 depicted in FIG. 17 is configured to estimate the distance between a multilayer target and a detector based on the spatial separation among diffraction orders determined at the detector and known system parameter values for λ and Λ.

In another aspect, a multilayer target is translated in a direction parallel or perpendicular to the layers of the multilayer target and perpendicular to the incident X-ray beam to align the incident X-ray beam with the center of the multilayer target along one axis.

Again referring to FIG. 5, X-ray beam 234 is incident on multilayer structure 232 and the layers of multilayer structure 232 are oriented parallel to incident X-ray beam 234. As depicted in FIG. 5, by way of example, the multilayer target is translated in a direction parallel with the X-axis of the wafer plane projected onto detector 235 (e.g., along axis 261). In another example, the multilayer target is translated in a direction perpendicular to the X-axis of the wafer plane projected onto detector 235. The physical dimensions of the multilayer structure (e.g., multilayer structure 232) determine whether it is advantageous to translate the multilayer structure in one direction or another. If the multilayer structure is substantially longer in one direction relative to the spot size of the incident X-ray beam and substantially similar or smaller in length relative to the spot size of the incident X-ray beam in another direction, it is advantageous to scan the multilayer structure in the direction where the extent of the multilayer structure is substantially similar in length relative to the spot size of the incident X-ray beam. This maximizes sensitivity of the measured diffraction orders to changes in position of the multilayer structure. As depicted in FIG. 5, the incident X-ray beam 234 is diffracted into a zero order beam, +/−1 order beams, and +/−2 order beams, etc., incident on detector 235 at measurement spot 236, measurement spots 237A-B, and measurement spots 238A-B, respectively. As depicted in FIG. 5, multilayer structure 232 diffracts incident beam 234 along the Y-axis of the wafer plane projected onto detector 235. When incident X-ray beam 234 is centered on the structural layers of multilayer structure 232 along the X-axis, the diffraction efficiency is maximal (i.e., the measured diffraction intensity is the highest). Small translations along axis 261 from perfect alignment in the X-direction cause a rapid decrease in diffraction efficiency. This sensitivity is employed to quickly and accurately align multilayer structure 232, and consequently the wafer stage, with the incident X-ray beam in the X-direction in the plane of the wafer projected onto the detector 235.

Again referring to FIG. 6, X-ray beam 234 is incident on multilayer structure 239 and the layers of multilayer structure 239 are oriented parallel to incident X-ray beam 234. In the embodiment depicted in FIG. 6, the multilayer target is translated in a direction parallel with the Y-axis of the wafer plane projected onto detector 235 (e.g., along axis 253). In another example, the multilayer target is translated in a direction perpendicular to the Y-axis of the wafer plane projected onto detector 235. Whether it is advantageous to translate the multilayer structure in one direction or another depends on the physical dimensions of the multilayer structure (e.g., multilayer structure 239) as described hereinbefore. The incident X-ray beam 234 is diffracted into a zero order beam, +/−1 order beams, and +/−2 order beams, etc., incident on detector 235 at measurement spot 243, measurement spots 244A-B, and measurement spots 245A-B, respectively. As depicted in FIG. 6, multilayer structure 239 diffracts incident beam 234 along the X-axis of the wafer plane projected onto detector 235. When incident X-ray beam 234 is centered on the structural layers of multilayer structure 239 along the Y-axis, the diffraction efficiency is maximal (i.e., the measured diffraction intensity is the highest). Small translations along axis 253 from perfect alignment in the Y-direction cause a rapid decrease in diffraction efficiency. This sensitivity is employed to quickly and accurately align multilayer structure 239, and consequently the wafer stage, with the incident X-ray beam in the Y-direction in the plane of the wafer projected onto the detector 235.

In the embodiments depicted in FIGS. 5 and 6 two different multilayer targets are employed by a metrology system to calibrate X-Y alignment of the wafer stage with respect to the incident X-ray beam. However, in general, a single multilayer target may be employed to calibrate X-Y alignment by simply rotating the multilayer target 90 degrees between each calibration.

In another aspect, a multilayer target is rotated about an axis of rotation perpendicular to the layers of the multilayer target and perpendicular to the incident X-ray beam to locate the axis of rotation of the wafer stage with respect to the incident X-ray beam and the multilayer target.

Figure 7:
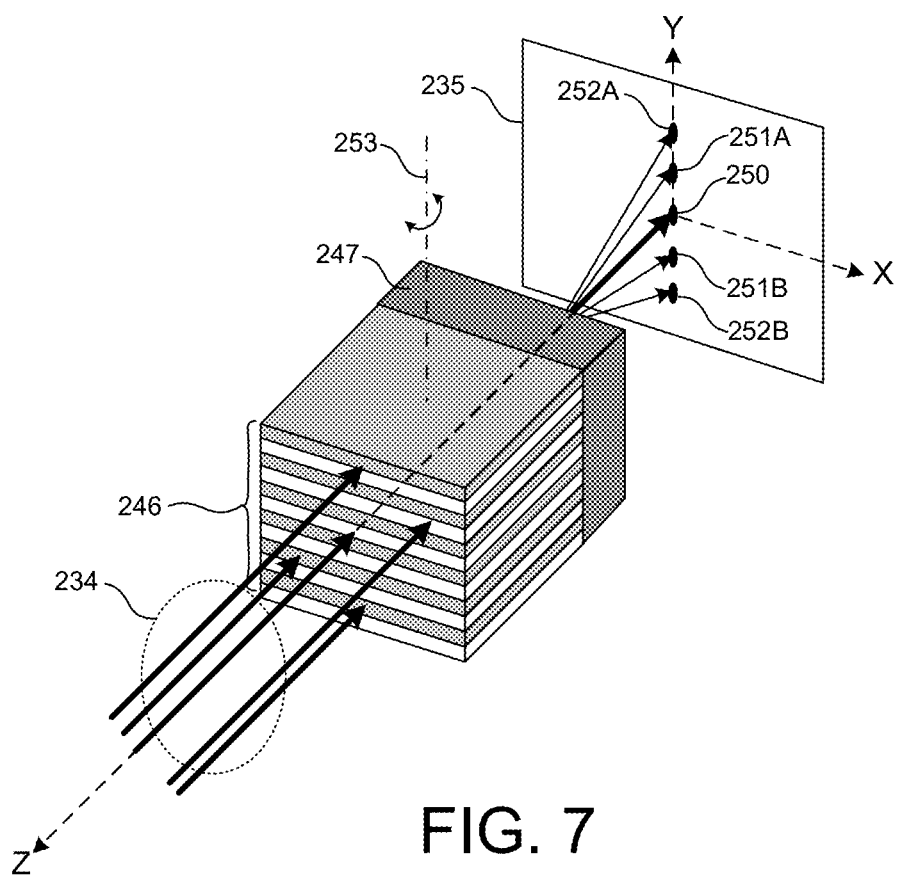
FIG. 7 is a diagram illustrative of an X-ray beam incident on a multilayer target in another embodiment.

FIG. 7 depicts an X-ray beam 234 incident on a multilayer target including multilayer structure 246 mounted to substrate 247. The resulting diffracted orders 250, 251A-B, and 252A-B are detected on detector 235. As depicted in FIG. 7, the layers of multilayer structure 246 are oriented parallel to incident X-ray beam 234 and incident X-ray beam 234 is centered in the X-direction with respect to multilayer structure 246. Furthermore, the layers of multilayer structure 246 are oriented parallel with the X-axis of the wafer plane projected onto detector 235. The incident X-ray beam 234 is diffracted into a zero order beam, +/−1 order beams, and +/−2 order beams, etc., incident on detector 235 at measurement spot 250, measurement spots 251A-B, and measurement spots 252A-B, respectively. As depicted in FIG. 7, multilayer structure 246 diffracts incident beam 234 along the Y-axis of the wafer plane projected onto detector 235.

When the axis of rotation 253 is perfectly centered with respect to multilayer structure 246 and incident X-ray 234 (i.e., intersects the longitudinal axis of incident X-ray beam 234 at the center of multilayer structure 246 along the X-axis and Z-axis), rotations about axis 253 do not affect the measured diffraction efficiency. However, if the axis of rotation 253 is not centered on multilayer target structure 246 in the X-direction and the Z-direction, the multilayer target structure 246 will precess in and out of the incident X-ray beam causing a reduction in the total signal of the diffracted beams. In this manner, the change of the diffracted flux with rotation of the multilayer target about axis 253 is employed to calibrate the misalignment of the axis rotation 253 with the axis of the incident X-ray beam 234 and the multilayer target structure 246 in the X and Z directions.

In another aspect, a composite multilayer target is provided that includes at least two multilayer structures arranged adjacent one another along a direction aligned with the incident X-ray beam, adjacent one another along a direction perpendicular to the incident X-ray beam, or a combination thereof. In this manner, multiple, multilayer targets are combined to form special calibration and alignment targets diffracting different parts of the incident X-ray beam with different diffraction angles and across different diffraction planes.

In some embodiments, the multilayer structures comprising a composite multilayer target are fabricated with substantially identical, repeatedly stacked, material pairs. In other words, each of the multilayer structures comprising a composite multilayer target includes material pairs that are substantially identical in thickness and material composition. However, in some other embodiments, one or more of the multilayer structures comprising a composite multilayer target are fabricated with repeatedly stacked material pairs that are different from other multilayer structures comprising the composite multilayer target. In other words, one or more of the multilayer structures comprising a composite multilayer target includes material pairs that differ in thickness, material composition, or both, compared to other multilayer structures comprising the composite multilayer target.

Figure 8:
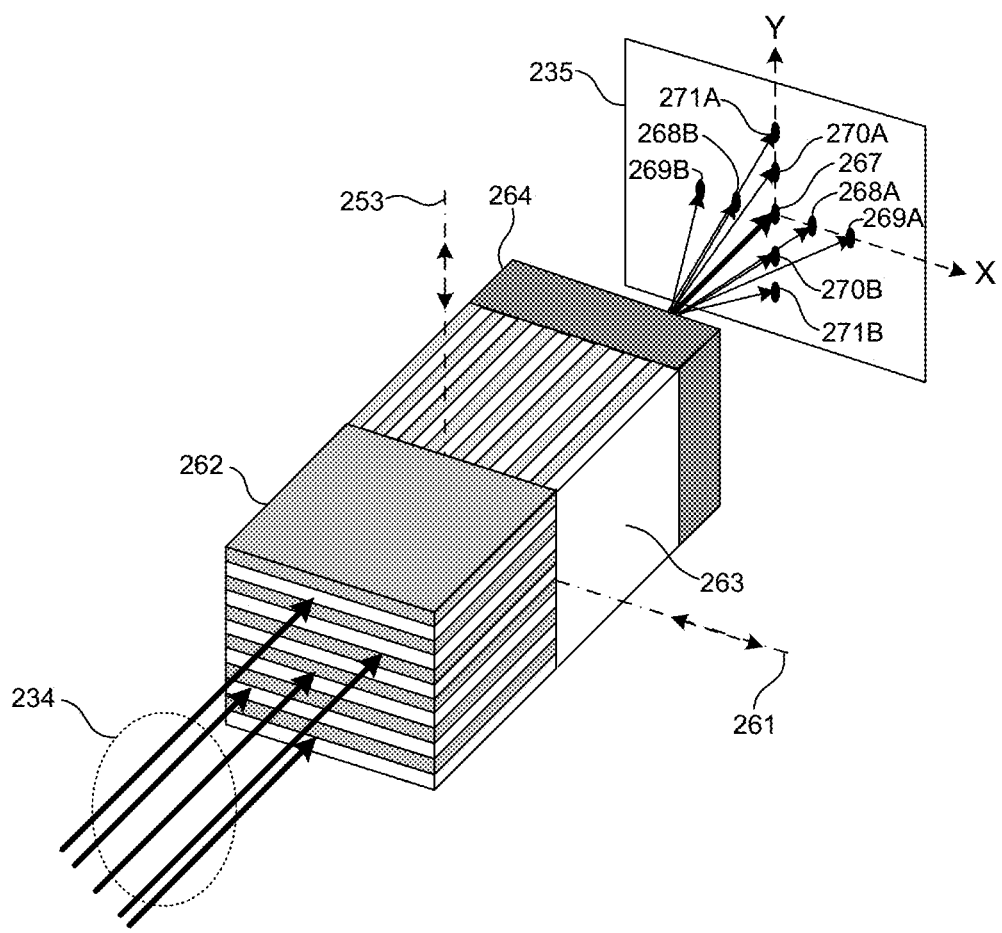
FIG. 8 is a diagram illustrative of an X-ray beam incident on a composite, multilayer target in one embodiment.

FIG. 8 depicts an X-ray beam 234 incident on a composite, multilayer target. The composite, multilayer target includes multilayer structure 262 mounted to multilayer structure 263, which in turn is mounted to substrate 264. Multilayer structures 262 and 263 and substrate 264 are mounted to one another in a direction aligned with incident X-ray beam. Layers of multilayer structure 262 are oriented parallel with the X-axis of the wafer plane projected onto detector 235. Layers of multilayer structure 263 are oriented parallel with the Y-axis of the wafer plane projected onto detector 235. The incident X-ray beam 234 is diffracted by multilayer structure 262 into a zero order beam, +/−1 order beams, and +/−2 order beams, etc., incident on detector 235 at measurement spot 267, measurement spots 270A-B, and measurement spots 271A-B, respectively. The incident X-ray beam 234 is diffracted by multilayer structure 263 into a zero order beam, +/−1 order beams, and +/−2 order beams, etc., incident on detector 235 at measurement spot 267, measurement spots 268A-B, and measurement spots 269A-B, respectively. As depicted in FIG. 8, the layers of multilayer structures 262 and 263 are oriented parallel to incident X-ray beam 234.

In a further aspect, the composite, multilayer target is translated in a direction parallel to the layers of the multilayer target structure 262 (i.e., the X-direction) and in a direction parallel to the layers of the multiple layer target structure 263 (i.e., the Y-direction) to align the incidence X-ray beam with the center of the composite, multilayer target along two axes.

When incident X-ray beam 234 is centered on the structural layers of multilayer structure 262 along the X-axis, the diffraction efficiency along the Y-axis is maximal (i.e., the measured diffraction intensity is the highest). When incident X-ray beam 234 is centered on the structural layers of multilayer structure 263 along the Y-axis, the diffraction efficiency along the X-axis is maximal (i.e., the measured diffraction intensity is the highest). Small translations from perfect alignment in either direction cause a rapid decrease in diffraction efficiency along the corresponding diffraction plane. This sensitivity is employed to quickly and accurately align the composite multilayer structure, and consequently the wafer stage, with the incident X-ray beam in the X and Y directions in the plane of the wafer projected onto the detector 235.

In a further aspect, the composite, multilayer target is rotated about an axis 261 parallel to the layers of multilayer structure 262 and is also rotated about an axis 253 parallel to the layers of multilayer structure 263 to align the layers of multilayer structures 262 and 263 with incident X-ray beam 234.

The diffraction efficiency of multilayer structure 262 is very sensitive to the orientation of multilayer structure 262 about axis 261 perpendicular to the incident X-ray beam 234 and parallel to the structural layers. When structural layers of multilayer structure 262 are perfectly parallel with incident X-ray beam 234, the diffraction efficiency is maximal along the Y-axis in the plane of the wafer projected onto the detector 235. Small rotations about axis 253 from perfect alignment cause a rapid decrease in diffraction efficiency. This sensitivity is employed to quickly and accurately align multilayer structure 262, and consequently the wafer stage, with the incident X-ray beam about an axis of rotation aligned with the X-axis in the plane of the wafer projected onto the detector 235. Similarly, the diffraction efficiency of multilayer structure 263 is very sensitive to the orientation of multilayer structure 263 about axis 253 perpendicular to the incident X-ray beam 234 and parallel to the structural layers. When structural layers of multilayer structure 263 are perfectly parallel with incident X-ray beam 234, the diffraction efficiency is maximal along the X-axis in the plane of the wafer projected onto the detector 235. Small rotations about axis 253 from perfect alignment cause a rapid decrease in diffraction efficiency. This sensitivity is employed to quickly and accurately align multilayer structure 263, and consequently the wafer stage, with the incident X-ray beam about an axis of rotation aligned with the Y-axis in the plane of the wafer projected onto the detector 235. In this manner, the zero angle of incidence about the X and Y axes of rotation in the plane of the wafer are calibrated.

Figure 9:
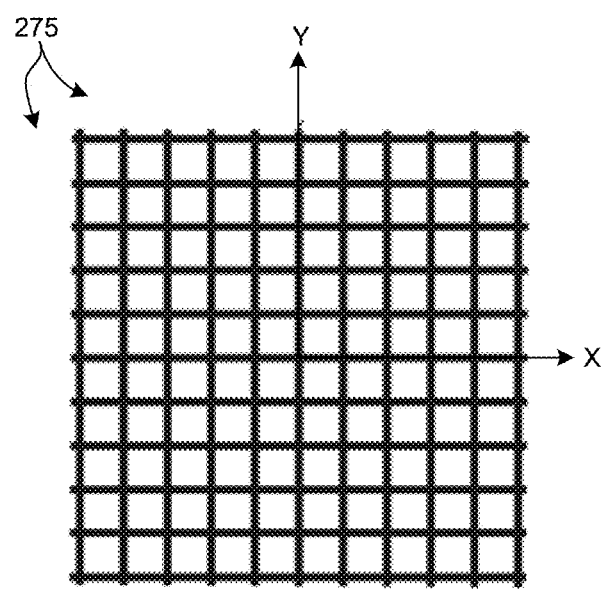
FIG. 9 is a diagram illustrative of an end view of the composite, multilayer target depicted in FIG. 8.

FIG. 9 depicts an illustration 275 of an end view of the composite, multilayer target depicted in FIG. 8. As depicted in FIG. 9, the composite, multilayer target includes two sets of multilayered structures oriented perpendicular to one another. One set of multilayered structures is aligned with the X-direction and the other set of multilayered structures is aligned with the Y-direction. The composite multilayer target depicted in FIGS. 8 and 9 is particularly suitable when preparing an X-ray based scatterometer system for measurement of semiconductor targets consisting of two orthogonal gratings.

Figure 10:
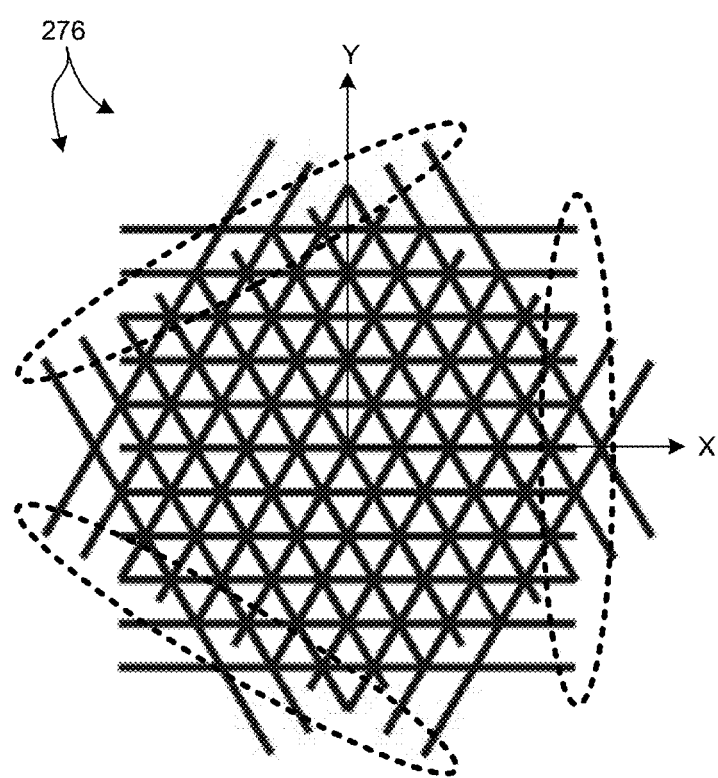
FIG. 10 is a diagram illustrative of an end view of a composite, multilayer target in another embodiment.

FIG. 10 depicts an illustration 276 of an end view of another composite, multilayer target including three sets of multilayered target each disposed adjacent another along a direction aligned with the incident X-ray beam. Furthermore, each of the multilayered target structures are oriented at 60 degrees with respect to one another, which generates a 6-fold symmetrical diffraction image. The composite multilayer target depicted in FIG. 10 is particularly suitable when preparing an X-ray based scatterometer system for measurement of semiconductor targets including a VNAND channel-hole etch structure.

In general, two or more distinct multilayer target structures of the same or different sizes, the same or different periods, or both, may be arranged adjacent another along a direction aligned with the incident X-ray beam.

Figure 11:
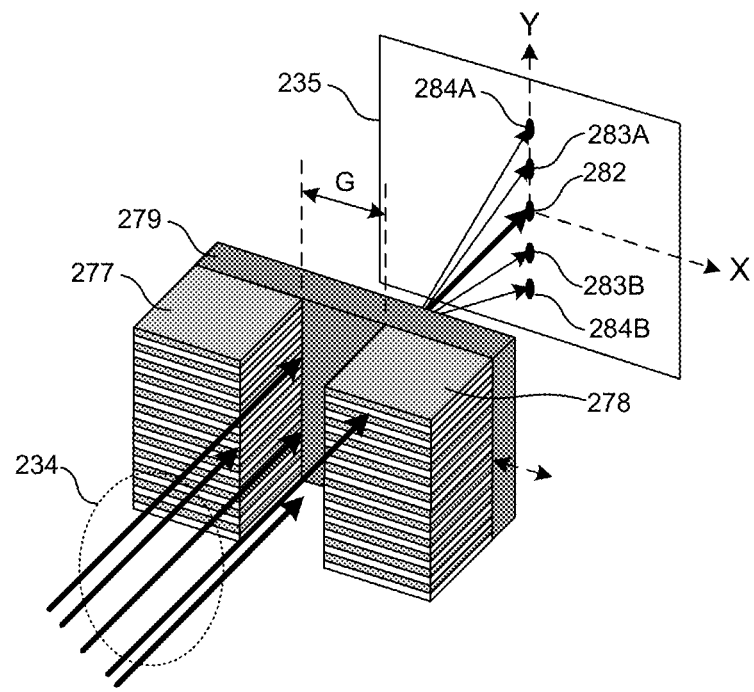
FIG. 11 is a diagram illustrative of an X-ray beam incident on a composite, multilayer target in yet another embodiment.

FIG. 11 depicts an X-ray beam 234 incident on a composite, multilayer target. The composite, multilayer target includes multilayer structure 277 mounted to substrate 279 and multilayer structure 278, also mounted to substrate 279. Multilayer structures 277 and 278 are mounted to substrate 279 in a common plane perpendicular to incident X-ray beam 234. Layers of multilayer structures 277 and 278 are oriented parallel with the X-axis of the wafer plane projected onto detector 235 and are oriented parallel to incident X-ray beam 234. In addition, multilayer structures 277 and 278 are separated from one another by a distance, G. The incident X-ray beam 234 is diffracted by multilayer structures 277 and 278 into a zero order beam, +/−1 order beams, and +/−2 order beams, etc., incident on detector 235 at measurement spot 282, measurement spots 283A-B, and measurement spots 284A-B, respectively.

In another aspect, the composite, multilayer target is translated along an axis parallel to the layers of multilayer structures 277 and 278 to align the gap between multilayer structures 277 and 278 with the incident X-ray beam 234. The measured diffraction indicates photon flux within a measurement box of the same size as the gap between multilayer structures 277 and 278, photon leakage outside the measurement box, and alignment of the measurement box to the incident X-ray beam 234.

The portion of the incident X-ray beam 234 passing through the gap between multilayer structures 277 and 278 does not contribute to the diffraction signal at non-zero orders at detector 235. Thus, the measured zero order flux indicates the photon flux passing through the gap. The portion of the incident X-ray beam 234 passing through multilayer structures 277 and 278 is diffracted and contributes to diffraction signal at non-zero orders at detector 235. The measurement of the overall diffracted signal on detector 235 (i.e., signal at the non-zero orders) indicates the overall degree of photon contamination (i.e., photon loss) outside the gap.

Figure 12:
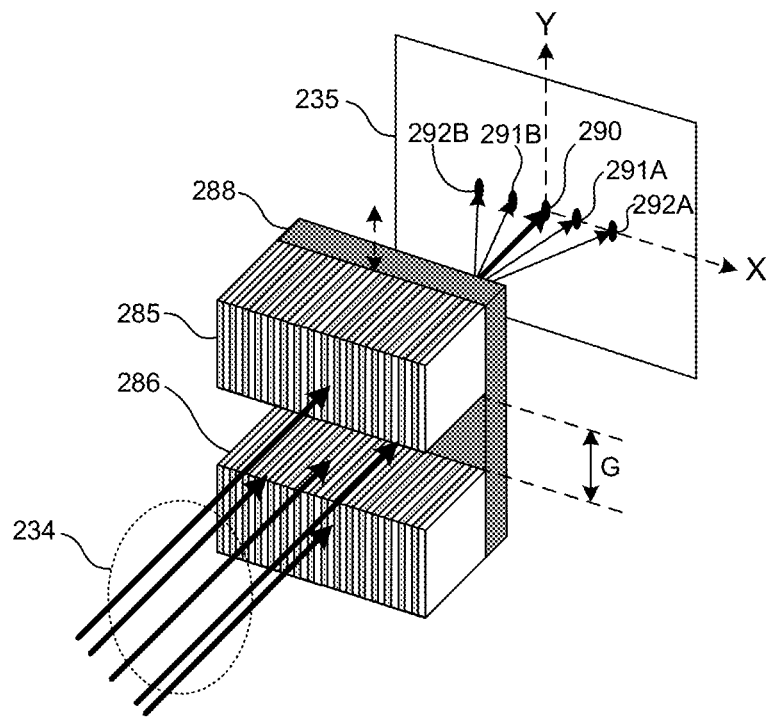
FIG. 12 is a diagram illustrative of an X-ray beam incident on a composite, multilayer target in yet another embodiment.

FIG. 12 depicts an X-ray beam 234 incident on a composite, multilayer target. The composite, multilayer target includes multilayer structure 285 mounted to substrate 288 and multilayer structure 286, also mounted to substrate 288. Multilayer structures 285 and 286 are mounted to substrate 288 in a common plane perpendicular to incident X-ray beam 234. Layers of multilayer structures 285 and 286 are oriented parallel with the Y-axis of the wafer plane projected onto detector 235 and are oriented parallel to incident X-ray beam 234. In addition, multilayer structures 285 and 286 are separated from one another by a distance, G, in the Y-direction. The incident X-ray beam 234 is diffracted by multilayer structures 285 and 286 into a zero order beam, +/−1 order beams, and +/−2 order beams incident on detector 235 at measurement spot 290, measurement spots 291A-B, and measurement spots 292A-B, respectively.

The portion of the incident X-ray beam 234 passing through the gap between multilayer structures 285 and 286 does not contribute to the diffraction signal at non-zero orders at detector 235. Thus, the measured zero order flux indicates the photon flux passing through the gap. The portion of the incident X-ray beam 234 passing through multilayer structures 285 and 286 is diffracted and contributes to diffraction signal at non-zero orders at detector 235. The measurement of the overall diffracted signal on detector 235 (i.e., signal at the non-zero orders) indicates the overall degree of photon contamination (i.e., photon loss) outside the gap. The asymmetry of the diffracted signals indicates the alignment of the composite multilayer target with respect to the incident beam 234 in the Y-direction.

Figure 13:
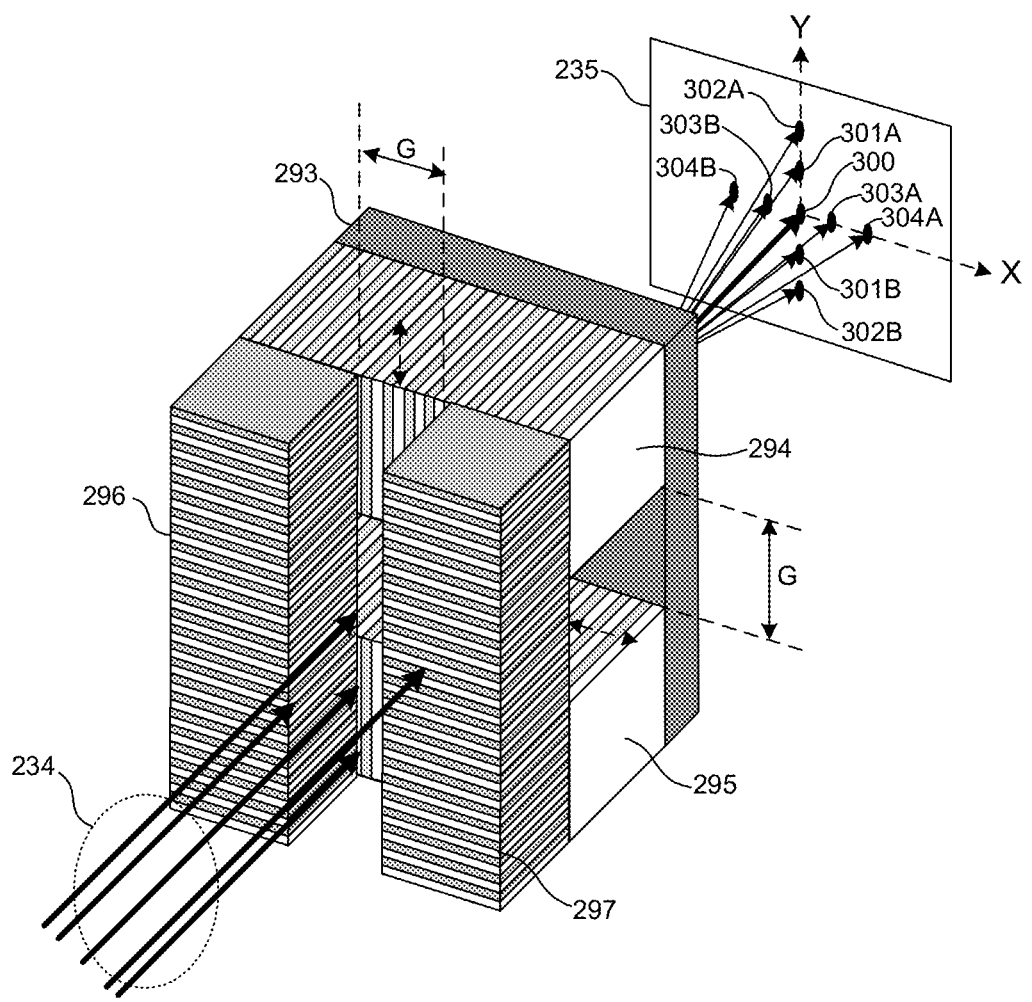
FIG. 13 is a diagram illustrative of an X-ray beam incident on a composite, multilayer target in yet another embodiment. The composite, multilayer target depicted in FIG. 13 combines the composite, multilayer targets depicted in FIGS. 11 and 12 in a direction aligned with the incident X-ray beam.

FIG. 13 depicts an X-ray beam 234 incident on a composite, multilayer target. The composite, multilayer target depicted in FIG. 13 combines the composite, multilayer targets depicted in FIGS. 11 and 12 in a direction aligned with the incident X-ray beam. The composite, multilayer target includes multilayer structure 294 mounted to substrate 293 and multilayer structure 295, also mounted to substrate 293. Multilayer structures 294 and 295 are mounted to substrate 293 in a common plane perpendicular to incident X-ray beam 234. Layers of multilayer structures 294 and 295 are oriented parallel with the Y-axis of the wafer plane projected onto detector 235 and are oriented parallel to incident X-ray beam 234. In addition, multilayer structures 294 and 295 are separated from one another by a distance, G, in the Y-direction. The incident X-ray beam 234 is diffracted by multilayer structures 294 and 295 into a zero order beam, +/−1 order beams, and +/−2 order beams incident on detector 235 at measurement spot 300, measurement spots 303A-B, and measurement spots 304A-B, respectively.

In addition, the composite, multilayer target includes multilayer structures 296 and 297 mounted to multilayer structures 294 and 295. Multilayer structures 296 and 297 are mounted to multilayer structures 294 and 295 in a common plane perpendicular to incident X-ray beam 234. Layers of multilayer structures 296 and 297 are oriented parallel with the X-axis of the wafer plane projected onto detector 235 and are oriented parallel to incident X-ray beam 234. In addition, multilayer structures 296 and 297 are separated from one another by a distance, G, in the X-direction. The incident X-ray beam 234 is diffracted by multilayer structures 296 and 297 into a zero order beam, +/−1 order beams, and +/−2 order beams incident on detector 235 at measurement spot 300, measurement spots 301A-B, and measurement spots 302A-B, respectively.

The portion of the incident X-ray beam 234 passing through the gap between multilayer structures 294-297 does not contribute to the diffraction signal at non-zero orders at detector 235. Thus, the measured zero order flux indicates the photon flux passing through the gap. The portion of the incident X-ray beam 234 passing through multilayer structures 294-297 is diffracted and contributes to diffraction signal at non-zero orders at detector 235. The measurement of the overall diffracted signal on detector 235 (i.e., signal at the non-zero orders) indicates the overall degree of photon contamination (i.e., photon loss) outside the gap. Alignment is performed to minimize possible photon contamination in the X-direction, the Y-direction, or both.

In general, the gap size is set to the desired measurement box size to gather insight into how much photon contamination is expected for a particular measurement system configuration. In one example, beam shaping slit positions are optimized to maximize photon flux, while maintaining photon contamination below a predetermined level.

In general, fabricating composite, multilayer targets from multilayer structures of different period, orientation, arrangement, or combinations thereof, enables the measurement of the contribution of different portions of the incident beam (e.g., left, right, top, bottom) into the photon contamination. The composite, multilayer target depicted in FIG. 13 enables alignment of the target to the incident X-ray beam in the X and Y directions, simultaneously, with minimum photon contamination (e.g., by optimizing the alignment and size of beam shaping slits). Furthermore, the level of overall photon contamination is quantified with the same measurement.

Figure 14:
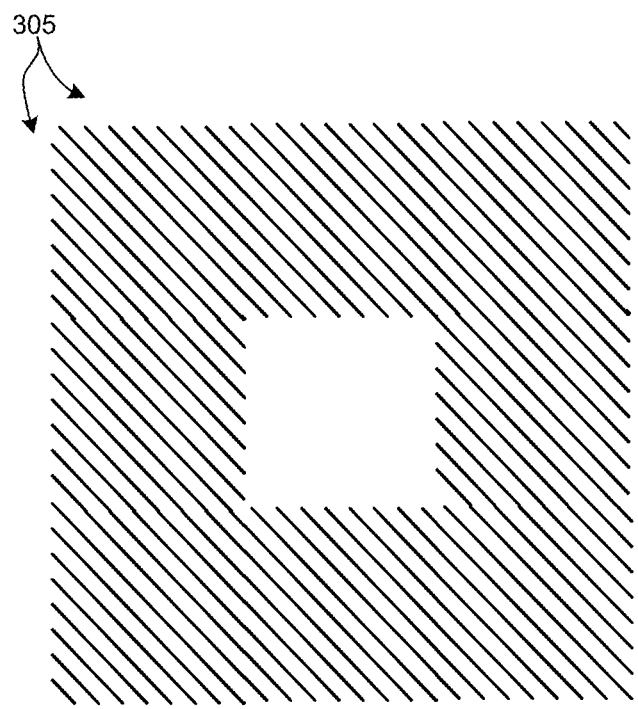
FIG. 14 is a diagram illustrative of an end view of a composite, multilayer target including eight multilayer structures surrounding an empty rectangular area equal to the measurement box size of a semiconductor target to be measured.

In general, many other composite, multilayer targets may be contemplated. FIG. 14 depicts an end view of a composite, multilayer target 305 including eight multilayer structures surrounding an empty rectangular area equal to the measurement box size of a semiconductor target to be measured. This target may be employed to align the target to the incident X-ray beam and measure overall photon contamination around the box size. Such a target may be fabricated from multilayer structures having the same or different periods, the same or different orientations with respect to one another, or a combination thereof.

Figure 15:
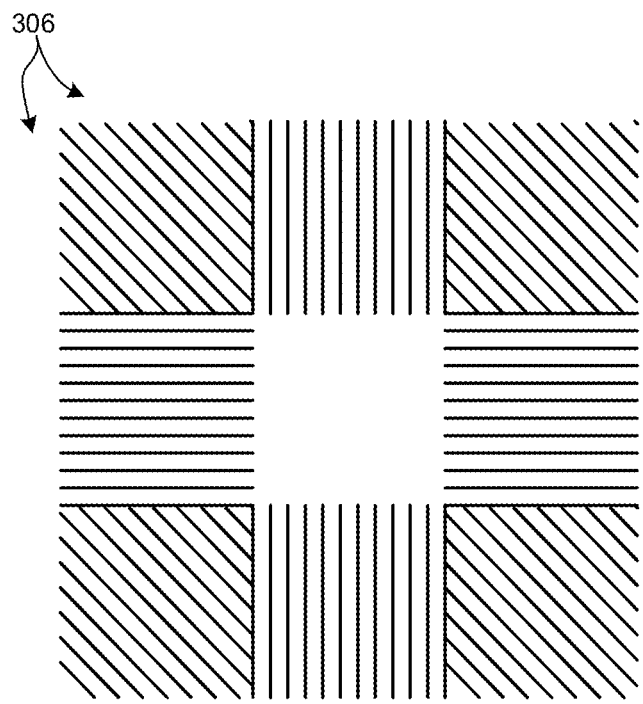
FIG. 15 is a diagram illustrative of an end view of a composite, multilayer target including eight multilayer structures in another embodiment.

FIG. 15 depicts an end view of a composite, multilayer target 306 including eight multilayer structures surrounding an empty rectangular area equal to the measurement box size of a semiconductor target to be measured. This target may be employed to align the target with the incident X-ray beam to minimize overall photon contamination around the box size and to individually resolve contributions to photon contamination in the horizontal, vertical, top, and bottom portions of the incident X-ray beam, simultaneously.

Figure 16:
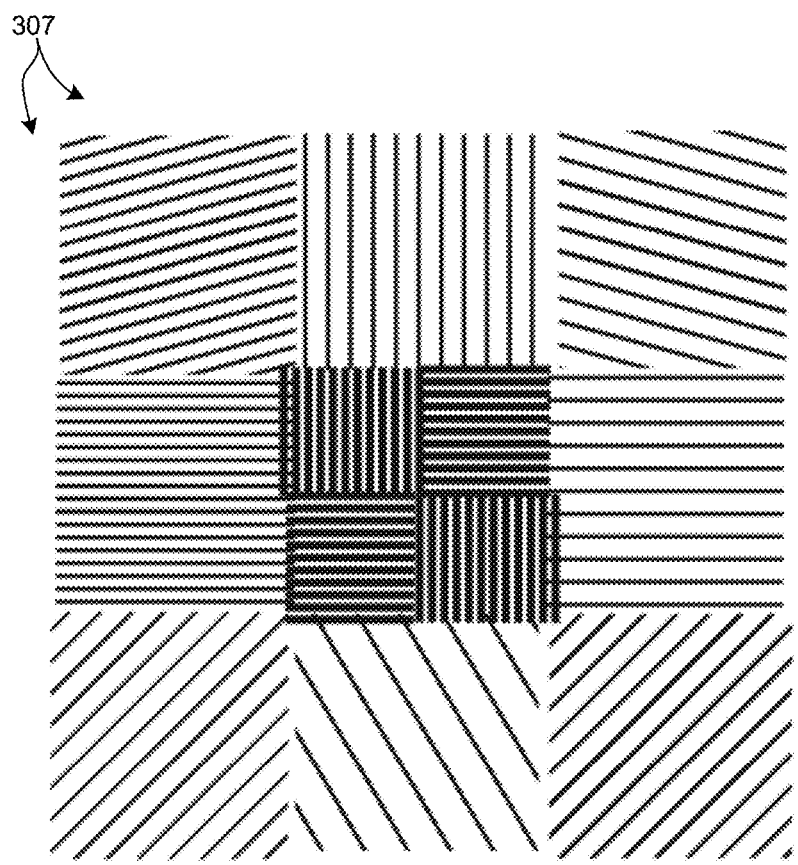
FIG. 16 is a diagram illustrative an end view of a composite, multilayer target in yet another embodiment.

FIG. 16 depicts an end view of a composite, multilayer target 307 including twelve multilayer structures. Each multilayer structure has unique angular arrangement and period. This enables optimal alignment of the target with the X-ray beam with the smallest achievable photon contamination around the box size. In addition, composite, multilayer target 307 enables simultaneous measurement of the contribution of each portion of the incident beam to photon contamination as each multilayer structure has unique angular arrangement and period, and thus diffracts radiation to different portions of the detector where they can be individually resolved.

FIG. 17 illustrates an embodiment of a T-SAXS metrology tool 100 for measuring characteristics of a specimen in at least one novel aspect. As shown in FIG. 17, the system 100 may be used to perform T-SAXS measurements over an inspection area 102 of a specimen 101 illuminated by an illumination beam spot.

In the depicted embodiment, metrology tool 100 includes an X-ray illumination subsystem 125 including an X-ray illumination source 110, focusing optics 111, beam divergence control slit 112, intermediate slit 113, and beam shaping slit mechanism 120. The X-ray illumination source 110 is configured to generate X-ray radiation suitable for T-SAXS measurements. In some embodiments, the X-ray illumination source 110 is configured to generate wavelengths between 0.01 nanometers and 1 nanometer. In general, any suitable high-brightness X-ray illumination source capable of generating high brightness X-rays at flux levels sufficient to enable high-throughput, inline metrology may be contemplated to supply X-ray illumination for T-SAXS measurements. In some embodiments, an X-ray source includes a tunable monochromator that enables the X-ray source to deliver X-ray radiation at different, selectable wavelengths.

In some embodiments, one or more X-ray sources emitting radiation with photon energy greater than 15 keV are employed to ensure that the X-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, a plasma based source, and an inverse Compton source may be employed as X-ray illumination source 110. In one example, an inverse Compton source available from Lyncean Technologies, Inc., Palo Alto, Calif. (USA) may be contemplated. Inverse Compton sources have an additional advantage of being able to produce X-rays over a range of photon energies, thereby enabling the X-ray source to deliver X-ray radiation at different, selectable wavelengths.

Exemplary X-ray sources include electron beam sources configured to bombard solid or liquid targets to stimulate X-ray radiation. Methods and systems for generating high brightness, liquid metal X-ray illumination are described in U.S. Pat. No. 7,929,667, issued on Apr. 19, 2011, to KLA-Tencor Corp., the entirety of which is incorporated herein by reference.

X-ray illumination source 110 produces X-ray emission over a source area having finite lateral dimensions (i.e., non-zero dimensions orthogonal to the beam axis. Focusing optics 111 focuses source radiation onto a metrology target located on specimen 101. The finite lateral source dimension results in finite spot size 102 on the target defined by the rays 117 coming from the edges of the source. In some embodiments, focusing optics 111 includes elliptically shaped focusing optical elements.

A beam divergence control slit 112 is located in the beam path between focusing optics 111 and beam shaping slit mechanism 120. Beam divergence control slit 112 limits the divergence of the illumination provided to the specimen under measurement. An additional intermediate slit 113 is located in the beam path between beam divergence control slit 112 and beam shaping slit mechanism 120. Intermediate slit 113 provides additional beam shaping. In general, however, intermediate slit 113 is optional. Additional description of an exemplary beam shaping slit mechanism is provided in U.S. Patent Publication No. 2017/0307548, the subject matter of which is incorporated herein by reference in its entirety.

Beam shaping slit mechanism 120 is located in the beam path immediately before specimen 101. In one aspect, the blades of beam shaping slit mechanism 120 are located in close proximity to specimen 101 to minimize the enlargement of the incident beam spot size due to beam divergence defined by finite source size. In one example, expansion of the beam spot size into the geometrical shadow created by beam shaping slit 120 due to finite source size is approximately one micrometer for a 10 micrometer X-ray source size and a distance of 25 millimeters between the beam shaping slits and specimen 101.

In some embodiments, beam shaping slit mechanism 120 includes multiple, independently actuated beam shaping slits. In one embodiment, beam shaping slit mechanism 120 includes four independently actuated beam shaping slits. These four beams shaping slits effectively block a portion of incoming beam 115 and generate an illumination beam 116 having a box shaped illumination cross-section.

Figure 18:
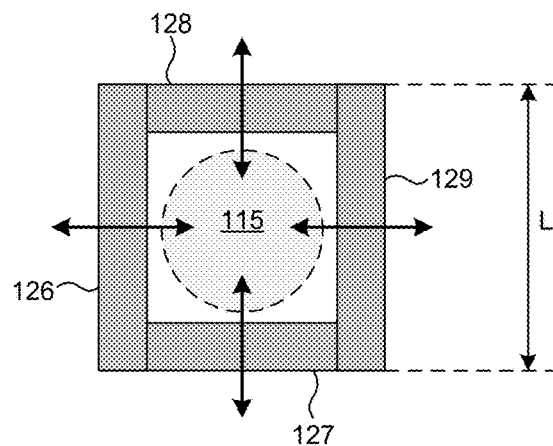
FIG. 18 depicts an end view of a beam shaping slit mechanism in one configuration.
Figure 19:
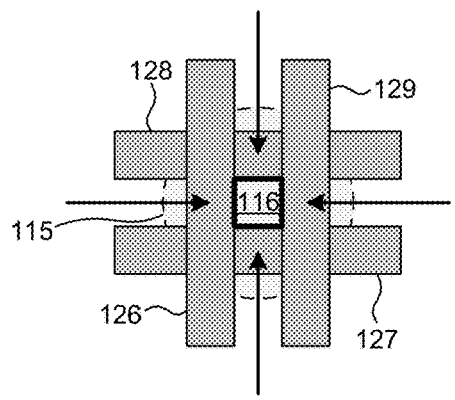
FIG. 19 depicts an end view of the beam shaping slit mechanism in another configuration.

FIGS. 18 and 19 depict an end view of beam shaping slit mechanism 120 depicted in FIG. 17 in two different configurations. As illustrated in FIGS. 18 and 19, the beam axis is perpendicular to the drawing page. As depicted in FIG. 18, incoming beam 115 has a large cross-section. In some embodiments, incoming beam 115 has a diameter of approximately one millimeter. Furthermore, the location of incoming beam 115 within beam shaping slits 126-129 may have an uncertainty of approximately three millimeters due to beam pointing errors. To accommodate the size of the incoming beam and the uncertainty of the beam location, each slit has a length, L, of approximately six millimeters. As depicted in FIG. 18, each slit is moveable in a direction perpendicular to the beam axis. In the illustration of FIG. 18, slits 126-129 are located at a maximum distance from the beam axis (i.e., the slits are fully open and they are not restricting the light passing through beam shaping slit mechanism 120).

FIG. 19 depicts slits 126-129 of beam shaping slit mechanism 120 in positions that block a portion of incoming beam 115, such that outgoing beam 116 delivered to the specimen under measurement has reduced size and well-defined shape. As depicted in FIG. 19, each of slits 126-129 has moved inward, toward the beam axis to achieve the desired output beam shape.

Slits 126-129 are constructed from materials that minimize scattering and effectively block incident radiation. Exemplary materials include single crystal materials such as Germanium, Gallium Arsenide, Indium Phosphide, etc. Typically, the slit material is cleaved along a crystallographic direction, rather than sawn, to minimize scattering across structural boundaries. In addition, the slit is oriented with respect to the incoming beam such that the interaction between the incoming radiation and the internal structure of the slit material produces a minimum amount of scattering. The crystals are attached to each slit holder made of high density material (e.g., tungsten) for complete blocking of the X-ray beam on one side of the slit. In some embodiments, each slit has a rectangular cross-section having a width is approximately 0.5 millimeters and a height of approximately 1-2 millimeters. As depicted in FIG. 18, the length, L, of a slit is approximately 6 millimeters.

In general, X-ray optics shape and direct X-ray radiation to specimen 101. In some examples, the X-ray optics include an X-ray monochromator to monochromatize the X-ray beam that is incident on the specimen 101. In some examples, the X-ray optics collimate or focus the X-ray beam onto measurement area 102 of specimen 101 to less than 1 milliradian divergence using multilayer X-ray optics.

In these examples, the multilayer X-ray optics function as a beam monochromator, also. In some embodiments, the X-ray optics include one or more X-ray collimating mirrors, X-ray apertures, X-ray beam stops, refractive X-ray optics, diffractive optics such as zone plates, Montel optics, specular X-ray optics such as grazing incidence ellipsoidal mirrors, polycapillary optics such as hollow capillary X-ray waveguides, multilayer optics or systems, or any combination thereof. Further details are described in U.S. Patent Publication No. 2015/0110249, the content of which is incorporated herein by reference it its entirety.

X-ray detector 119 collects X-ray radiation 114 scattered from specimen 101 and generates output signals 135 indicative of properties of specimen 101 that are sensitive to the incident X-ray radiation in accordance with a T-SAXS measurement modality. In some embodiments, scattered X-rays 114 are collected by X-ray detector 119 while specimen positioning system 140 locates and orients specimen 101 to produce angularly resolved scattered X-rays.

In some embodiments, a T-SAXS system includes one or more photon counting detectors with high dynamic range (e.g., greater than $10^5$). In some embodiments, a single photon counting detector detects the position and number of detected photons.

In some embodiments, the X-ray detector resolves one or more X-ray photon energies and produces signals for each X-ray energy component indicative of properties of the specimen. In some embodiments, the X-ray detector 119 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 135 for further processing and storage.

In some embodiments, x-ray illumination source 110, focusing optics 111, slits 112 and 113, or any combination thereof, are maintained in the same atmospheric environment as specimen 101 (e.g., gas purge environment). However, in some embodiments, the optical path length between and within any of these elements is long and x-ray scattering in air contributes noise to the image on the detector. Hence in some embodiments, any of x-ray illumination source 110, focusing optics 111, and slits 112 and 113 are maintained in a localized, vacuum environment. In the embodiment depicted in FIG. 1, focusing optics 111, slits 112 and 113, and beam shaping slit mechanism 120 are maintained in a controlled environment (e.g., vacuum) within an evacuated flight tube 118. The illumination beam 116 passes through window 121 at the end of flight tube 118 before incidence with specimen 101. Similarly, in some embodiments, the optical path length between specimen 101 and detector 119 (i.e., the collection beam path) is long and x-ray scattering in air contributes noise to the image on the detector. Hence, in preferred embodiments, a significant portion of the collection beam path length between specimen 101 and detector 119 is maintained in a localized vacuum environment separated from the specimen (e.g., specimen 101) by a vacuum window (e.g., vacuum window 124). In some embodiments, x-ray detector 119 is maintained in the same localized vacuum environment as the beam path length between specimen 101 and detector 119. For example, as depicted in FIG. 17, vacuum chamber 123 maintains a localized vacuum environment surrounding detector 119 and a significant portion of the beam path length between specimen 101 and detector 119.

In a further aspect, a T-SAXS system is employed to determine properties of a specimen (e.g., structural parameter values) based on one or more diffraction orders of scattered light. As depicted in FIG. 17, metrology tool 100 includes a computing system 130 employed to acquire signals 135 generated by detector 119 and determine properties of the specimen based at least in part on the acquired signals.

In some examples, metrology based on T-SAXS involves determining the dimensions of the sample by the inverse solution of a pre-determined measurement model with the measured data. The measurement model includes a few (on the order of ten) adjustable parameters and is representative of the geometry and optical properties of the specimen and the optical properties of the measurement system. The method of inverse solve includes, but is not limited to, model based regression, tomography, machine learning, or any combination thereof. In this manner, target profile parameters are estimated by solving for values of a parameterized measurement model that minimize errors between the measured scattered X-ray intensities and modeled results.

It is desirable to perform measurements at large ranges of angle of incidence and azimuth angle to increase the precision and accuracy of measured parameter values. This approach reduces correlations among parameters by extending the number and diversity of data sets available for analysis to include a variety of large-angle, out of plane orientations. For example, in a normal orientation, T-SAXS is able to resolve the critical dimension of a feature, but is largely insensitive to sidewall angle and height of a feature. However, by collecting measurement data over a broad range of out of plane angular orientations, the sidewall angle and height of a feature can be resolved. In other examples, measurements performed at large ranges of angle of incidence and azimuth angle provide sufficient resolution and depth of penetration to characterize high aspect ratio structures through their entire depth.

Measurements of the intensity of diffracted radiation as a function of X-ray incidence angle relative to the wafer surface normal are collected. Information contained in the multiple diffraction orders is typically unique between each model parameter under consideration. Thus, X-ray scattering yields estimation results for values of parameters of interest with small errors and reduced parameter correlation.

Figure 20:
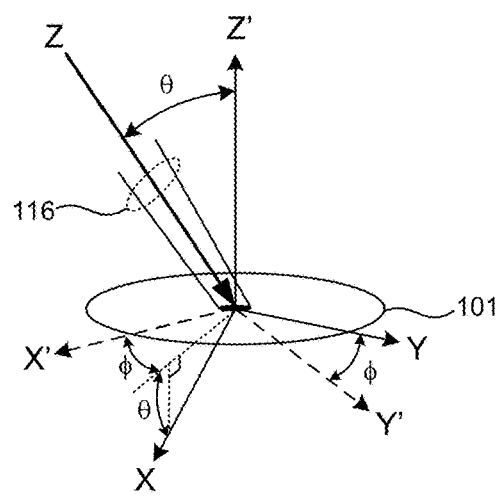
FIG. 20 depicts an X-ray illumination beam incident on a wafer at a particular orientation described by angles θ and 0.

Each orientation of the illuminating X-ray beam 116 relative to the surface normal of a semiconductor wafer 101 is described by any two angular rotations of wafer 101 with respect to the X-ray illumination beam 115, or vice-versa. In one example, the orientation can be described with respect to a coordinate system fixed to the wafer. FIG. 20 depicts X-ray illumination beam 116 incident on wafer 101 at a particular orientation described by an angle of incidence, θ, and an azimuth angle, φ. Coordinate frame XYZ is fixed to the metrology system (e.g., illumination beam 116) and coordinate frame X'Y'Z' is fixed to wafer 101. The Y axis is aligned in plane with the surface of wafer 101. X and Z are not aligned with the surface of wafer 101. Z' is aligned with an axis normal to the surface of wafer 101, and X' and Y' are in a plane aligned with the surface of wafer 101. As depicted in FIG. 4, X-ray illumination beam 116 is aligned with the Z-axis and thus lies within the XZ plane. Angle of incidence, θ, describes the orientation of the X-ray illumination beam 116 with respect to the surface normal of the wafer in the XZ plane. Furthermore, azimuth angle, φ, describes the orientation of the XZ plane with respect to the X'Z' plane. Together, θ and φ, uniquely define the orientation of the X-ray illumination beam 116 with respect to the surface of wafer 101. In this example, the orientation of the X-ray illumination beam with respect to the surface of wafer 101 is described by a rotation about an axis normal to the surface of wafer 101 (i.e., Z' axis) and a rotation about an axis aligned with the surface of wafer 101 (i.e., Y axis). In some other examples, the orientation of the X-ray illumination beam with respect to the surface of wafer 101 is described by a rotation about a first axis aligned with the surface of wafer 101 and another axis aligned with the surface of wafer 101 and perpendicular to the first axis.

In some embodiments, metrology tool 100 includes a specimen positioning system 140 configured to locate a wafer vertically (i.e., plane of the wafer surface approximately aligned with the gravity vector) and actively position specimen 101 in six degrees of freedom with respect to illumination beam 116. In addition, specimen positioning system 140 is configured to align specimen 101 and orient specimen 101 over a large range of angles of incidence (e.g., at least 70 degrees) and azimuth angle (e.g., at least 190 degrees) with respect the illumination beam 116. In some embodiments, specimen positioning system 140 is configured to rotate specimen 101 over a large range of angles of rotation (e.g., at least 70 degrees) aligned in-plane with the surface of specimen 101. In this manner, angle resolved measurements of specimen 101 are collected by metrology system 100 over any number of locations and orientations on the surface of specimen 101. In one example, computing system 130 communicates command signals (not shown) to specimen positioning system 140 that indicate the desired position of specimen 101. In response, specimen positioning system 140 generates command signals to the various actuators of specimen positioning system 140 to achieve the desired positioning of specimen 101.

Figure 21:
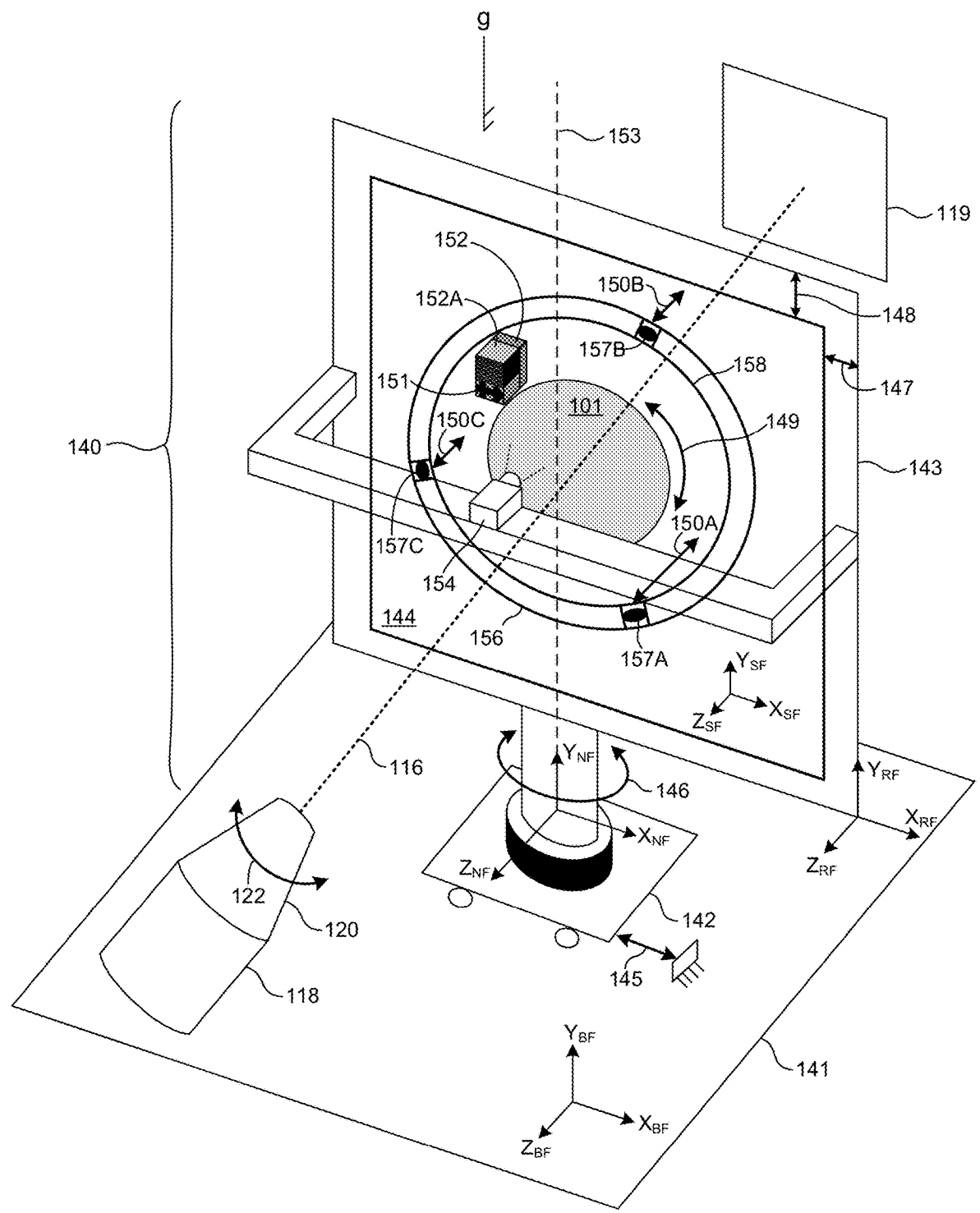
FIG. 21 is a diagram illustrative of a specimen positioning system with a wafer stage moved to a position where an illumination beam is incident on a wafer.

FIG. 21 depicts a specimen positioning system 140 in one embodiment. Specimen positioning system 140 provides active control of the position of wafer 101 with respect to illumination beam 116 in all six degrees of freedom while supporting wafer 101 vertically with respect to the gravity vector (i.e., the gravity vector is approximately in-plane with the wafer surface). Specimen positioning system 140 supports wafer 101 at the edges of wafer 101 allowing illumination beam 116 to transmit through wafer 101 over any portion of the active area of wafer 101 without remounting wafer 101. By supporting wafer 101 vertically at its edges, gravity induced sag of wafer 101 is effectively mitigated.

As depicted in FIG. 21, specimen positioning system 140 includes a base frame 141, a lateral alignment stage 142, a stage reference frame 143, and a wafer stage 144 mounted to stage reference frame 143. For reference purposes, the $\{X_{BF}, Y_{BF}, Z_{BF}\}$ coordinate frame is attached to base frame 141, the $\{X_{NF}, Y_{NF}, Z_{NF}\}$ coordinate frame is attached to lateral alignment stage 142, the $\{X_{RF}, Y_{RF}, Z_{RF}\}$ coordinate frame is attached to stage reference frame 143, and the $\{X_{SF}, Y_{SF}, Z_{SF}\}$ coordinate frame is attached to wafer stage 144. Wafer 101 is supported on wafer stage 144 by a tip-tilt-Z stage 156 including actuators 150A-C. A rotary stage 158 mounted to tip-tilt-Z stage 156 orients wafer 101 over a range of azimuth angles, φ, with respect to illumination beam 116. In the depicted embodiment, three linear actuators 150A-C are mounted to the wafer stage 144 and support rotary stage 158, which, in turn, supports wafer 101.

Actuator 145 translates the lateral alignment stage 142 with respect to the base frame 141 along the $X_{BF}$ axis. Rotary actuator 146 rotates the stage reference frame 143 with respect to lateral alignment stage 142 about an axis of rotation 153 aligned with the $Y_{NF}$ axis. Rotary actuator 146 orients wafer 101 over a range of angles of incidence, θ, with respect to illumination beam 116. Wafer stage actuators 147 and 148 translate the wafer stage 144 with respect to the stage reference frame 143 along the $X_{RF}$ and $Y_{RF}$ axes, respectively.

In some embodiments, wafer stage 144 is an open aperture, two-axis (XY) linear stacked stage. The open aperture allows the measurement beam to transmit through any portion of the entire wafer (e.g., 300 millimeter wafer). The wafer stage 144 is arranged such that the Y-axis stage extends in a direction approximately parallel to the axis of rotation 153. Furthermore, the Y-axis stage extends in a direction that is approximately aligned with the gravity vector.

Actuators 150A-C operate in coordination to translate the rotary stage 158 and wafer 101 with respect to the wafer stage 144 in the $Z_{SF}$ direction and tip and tilt rotary stage 158 and wafer 101 with respect to the wafer stage 144 about axes coplanar with the $X_{SF}$—$Y_{SF}$ plane. Actuator 149 of rotary stage 158 rotates wafer 101 about an axis normal to the surface of wafer 101. In a further aspect, a frame of rotary stage 158 is coupled to actuators 150A-C by a kinematic mounting system including kinematic mounting elements 157A-C, respectively. In one example, each kinematic mounting element 157A-C includes a sphere attached to a corresponding actuator and a V-shaped slot attached to rotary stage 158. Each sphere makes a two point contact with a corresponding V-shaped slot. Each kinematic mounting element constrains the motion of rotary stage 158 with respect to actuators 150A-C in two degrees of freedom and collectively, the three kinematic mounting elements 157A-C constrain the motion of rotary stage 158 with respect to actuators 150A-C in six degrees of freedom. Each kinematic coupling element is preloaded to ensure that the sphere remains in contact with the corresponding V-shaped slot at all times. In some embodiments, the preload is provided by gravity, a mechanical spring mechanism, or a combination thereof.

In another further aspect, rotary stage 158 is an open aperture, rotary stage. The open aperture allows the measurement beam to transmit through any portion of the entire wafer (e.g., 300 millimeter wafer). The rotary stage 158 is arranged such that its axis of rotation is approximately perpendicular to the axis of rotation 153. Furthermore, the axis of rotation of the rotary stage 158 is approximately perpendicular to the gravity vector. The wafer 101 is secured to the rotary stage 158 via edge grippers to provide full wafer coverage with minimal edge exclusion.

In summary, specimen positioning system 140 is capable of actively controlling the position of wafer 101 in six degrees of freedom with respect to the illumination beam 116 such that illumination beam 116 may be incident at any location on the surface of wafer 101 (i.e., at least 300 millimeter range in XRF and YRF directions). Rotary actuator 146 is capable of rotating the stage reference frame 143 with respect to the illumination beam 116 such that illumination beam 116 may be incident at the surface of wafer 101 at any of a large range of angles of incidence (e.g., greater than two degrees). In one embodiment, rotary actuator 146 is configured to rotate stage reference frame 143 over a range of at least sixty degrees. Rotary actuator 146 mounted to wafer stage 144 is capable of rotating the wafer 101 with respect to the illumination beam 116 such that illumination beam 116 may be incident at the surface of wafer 101 at any of a large range of azimuth angles (e.g., at least ninety degrees rotational range). In some embodiments, the range of azimuth angles is at least one hundred ninety degrees rotational range.

In some other embodiments, lateral alignment stage 142 is removed and stage reference frame 143 is rotated with respect to base frame 141 by rotary actuator 146. In these embodiments, the X-ray illumination system includes one or more actuators that move one or more optical elements of the X-ray illumination system that cause the X-ray illumination beam 116 to move with respect to the base frame 141, for example, in the XBF direction. In these embodiments, movements of stage reference stage 143 for purposes of calibration as described herein are replaced by movements of one or more optical elements of the X-ray illumination system that move the X-ray illumination beam to the desired position with respect to the axis of rotation 153, for example. In the embodiments depicted in FIG. 17 and FIG. 24, computing system 130 communicates command signals 138 to actuator subsystem 111' to redirect the X-ray emission relative to base frame 141 to achieve a desired beam direction by moving one or more elements of X-ray illumination subsystem 125. In the depicted embodiment, actuator subsystem 111' moves focusing optics 111 to redirect the X-ray emission relative to base frame 141, and thus relocate the X-ray emission relative to the axis of rotation 153.

In general, the specimen positioning system provides automated positioning of semiconductor wafers in six degrees of freedom. In addition, the specimen positioning system includes edge gripping features and actuators on the rotary stage to effectively load and unload the wafer in the vertical position in coordination with a wafer handling robot.

In some embodiments, three sensors are disposed on the specimen positioning system to measure the distance of the backside of the wafer with respect to the specimen positioning system. In this manner, the wafer bow is measured and compensated by movement of the wafer using the tip-tilt-Z stage.

In another aspect, a SAXS metrology system employs at least one high diffraction efficiency, multilayer target to locate an X-ray illumination beam with respect to the specimen positioning system. The multilayer target includes at least one marker and at least one multilayer structure. An alignment camera is employed to locate the marker in coordinates of the specimen positioning system. The location of the marker with respect to the multilayer structure is known apriori (e.g., with an accuracy of less than 200 nanometers). Thus, the location of the multilayer structure in coordinates of the specimen positioning system is easily determined by a straightforward coordinate transformation. The multilayer structure is scanned across the illumination beam while the detected intensity of the transmitted flux is measured. The center of the illumination beam is precisely located with respect to the multilayer structure based on the measured intensity as described hereinbefore. Since the location of the multilayer structure is known in the coordinates of the specimen positioning system, the location of center of the illumination beam in the coordinates of the specimen positioning system is precisely located by simple coordinate transformation.

In some examples, a multilayer target is employed to calibrate the location of incidence of the illumination beam with respect to the specimen positioning system. In some other examples, a multilayer target is employed to align the axis of rotation of the stage reference frame with respect to the illumination beam at the point of incidence of illumination beam with a wafer.

Figure 23:
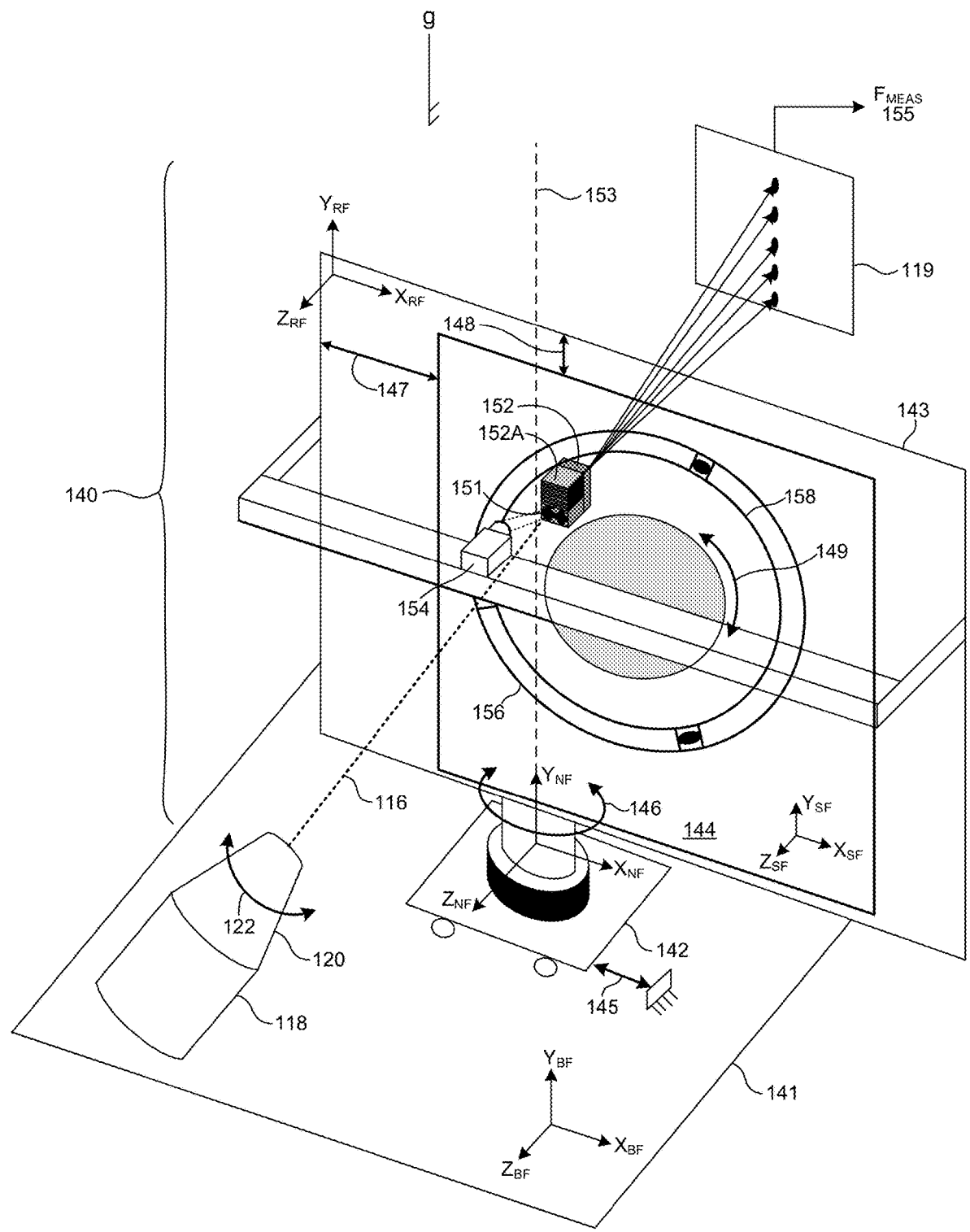
FIG. 23 is a diagram illustrative of the specimen positioning system with the wafer stage moved to a position where the X-ray beam is incident on a multilayer calibration target.

FIG. 23 depicts a multilayer target 152 in one embodiment. In the embodiment depicted in FIG. 23, multilayer target 152 includes a multilayer structure 152A and a marker 151. In some embodiments, multilayer target 152 is mounted to a specimen positioning system such as specimen positioning system 140. In these embodiments, multilayer target 152 is mounted to specimen positioning system 140, rather than a calibration wafer. In some other embodiments, multilayer target 152 may be mounted to, or fabricated as an integral part of, a specialized calibration wafer that includes one or more multilayer targets. Multilayer target 152 also includes one or more markers (e.g., markers 151) readable by an optical microscope mounted to the specimen positioning system. The location of markers 151 with respect to the multilayer structure 152A is known precisely. In this manner, the location of multilayer structure 152A is determined by simple coordinate transformation from the location of markers 151.

In the embodiment depicted in FIG. 23, multilayer target 152 is mounted to the frame of rotary stage 158 such that the center of multilayer structure 152A is approximately co-planar with the surface of wafer 101. As depicted in FIG. 23, the center of multilayer structure 152A is approximately aligned parallel with the $Y_{NF}$ axis and the $X_{RF}$ axis.

Specimen positioning system 140 also includes an alignment camera 154 mounted to stage reference frame 143. In the depicted embodiment, the alignment camera is mounted to the stage reference frame, and thus rotates with the stage reference frame. Alignment camera 154 is configured to generate high resolution images of objects in its field of view, such as wafer 101. In some embodiments, alignment camera 154 also includes an auto-focus mechanism that maintains a sharp image focus by precisely moving the focal point of the camera by a measured distance. In some of these embodiments, alignment camera 154 can be used to measure relative distances between the stage reference frame to which the camera body is mounted and wafer 101 or markers 151 imaged by the camera by monitoring the z-displacement of the focal point of the camera.

In some other embodiments, an alignment camera is mounted to lateral alignment stage 142. In some of these embodiments, the alignment camera is used to measure relative distances between the $\{X_{NF}, Y_{NF}, Z_{NF}\}$ coordinate frame to which the camera body is mounted and wafer 101 or markers 151 imaged by the camera by monitoring the location of optical markers mounted to wafer 101 or markers 151 within the field of view of the alignment camera.

In one further aspect, the precise location of incidence of the illumination beam in one dimension in the plane of the surface of the wafer is determined based on the interaction of the illumination beam with a multilayer target.

FIG. 23 is a diagram illustrative of the specimen positioning system 140 with the wafer stage moved to a position where the illumination beam 116 is incident on the multilayer structure 152A of multilayer target 152. The precise location of incidence of the illumination beam with respect to multilayer structure 152A is determined based on transmitted flux measured by detector 119 as a function of the X position of multilayer structure 152A with respect to illumination beam 116 (i.e., base frame 141). As depicted in FIG. 23, as multilayer structure 152A is moved in the X-direction, detector 119 generates signals 155 indicative of the measured flux as a function of X-position and the results are analyzed to identify the position of multilayer structure 152A that corresponds with the center of illumination beam 116.

Alignment in the Y-direction and other alignments described herein are achieved by measuring other multilayer targets, reorienting multilayer target 152, or a combination thereof, in accordance with the techniques described hereinbefore. In general, more than one multilayer target may be utilized to generate redundancy and increase the accuracy of the calibration of the beam location and orientation.

As depicted in FIG. 23, the center of the illumination beam 116 is aligned with multilayer target 152 as described hereinbefore. In the embodiment depicted in FIG. 23, a fiducial mark 151 is located on a surface of multilayer target 152 having a known location with respect to multilayer structure 152A. At the location of beam center alignment with multilayer target 152, the position of the illumination beam 116 with respect to multilayer target 152, or fiducial 151, is recorded by alignment camera 154. This registers the relative position of the illumination beam with respect to a precise location in the field of view of the alignment camera (assuming no change in focus position). As depicted in FIG. 21, wafer 101 is moved within the field of view of alignment camera 154. Wafer 101 is moved such that a desired location (e.g., a fiducial mark) on the wafer is imaged within the field of view of alignment camera 154. The position of the illumination beam 116 with respect to the desired location is determined by alignment camera 154 based on the previous registration. In this manner, the position of the illumination beam 116 on wafer 101 in the X and Y direction is quickly estimated based on an image collected by the alignment camera 154. In some embodiments, the position of the wafer in the Z-direction with respect to the Z-location of multilayer target 152 is measured by changing the focus position of alignment camera 154 until the lithographic features on the surface of wafer 101 come into precise focus. The change in focus position is indicative of the difference in Z-position between the multilayer target 152 and the imaged location on the wafer. In some other embodiments, the position of the wafer in the Z-direction with respect to the Z-location of multilayer target 152 is measured by one or more optical proximity sensors, capacitive proximity sensors, interferometry based sensors, or other suitable proximity sensors. Actuators 150A-C may be employed to reposition wafer 101 in the Z-direction to relocate the imaged location to be in plane with the multilayer target 152.

In a further aspect, the position of incidence of the illumination beam is determined at any location on the wafer based on wafer stage coordinates. Once the center of the illumination beam is aligned with multilayer target 152, and the position of the illumination beam with respect to multilayer target 152 is recorded by an alignment camera as described hereinbefore, the location of incidence of the illumination beam can be transferred to stage coordinates. As depicted in FIG. 21, wafer 101 is moved within the field of view of alignment camera 154. The movement of wafer 101 is measured by the position measurement system of wafer stage 144 (e.g., linear encoders, etc.) By moving wafer 101 to three or more desired locations (e.g., a fiducial marks) on the wafer imaged within the field of view of alignment camera 154, the position of the illumination beam with respect to the desired location is determined at each desired location, along with the position of the wafer in stage coordinates. Based on the known location of the illumination beam and stage coordinates at the three or more locations, a map is generated that relates stage coordinates to the location of incidence of the illumination beam.

After locating the multilayer target 152 at the center of illumination beam 116 (in the X-direction), alignment camera 154 images the location of the fiducial mark 151 located on multilayer target 152, to establish a relationship between beam location and image location within the field of view of alignment camera 154. Since alignment camera 154 is located in a fixed, or repeatable, position with respect to the stage reference frame 143, the image registers the location of the illumination beam with respect to the stage reference frame 143, and thus serves as a reference for beam location in the X-direction. Moreover, alignment camera 154 establishes a precise focus position of the fiducial mark, to establish a precise Z-location of the multilayer target 152 with respect to stage reference frame 143. For embodiments where the alignment camera 154 rotates with the stage reference frame, the focus position of the alignment camera 154 serves as a reference for Z-position of the multilayer target 152 with respect to the stage reference frame.

In another aspect, the precise alignment of the axis of rotation 153 with the illumination beam in the plane of the surface of the wafer is determined based on the interaction of the illumination beam with multilayer target 152 as measured by the X-ray detector 119.

To ensure measurement integrity, the location of incidence of illumination beam 116 on the surface of wafer 101 should remain stationary during measurements over a large range of angles of incidence and azimuth angles. To achieve this objective, the axis of rotation 153 of stage reference frame 143 must be approximately co-planar with the surface of wafer 101 at the measurement location. Furthermore, the axis of rotation 153 must be aligned with the illumination beam 116 in the $X_{BF}$ direction such that the axis of rotation 153 intersects the illumination beam 116 at the point of incidence of illumination beam 116 with wafer 101 at the measurement location.

Figure 22A:
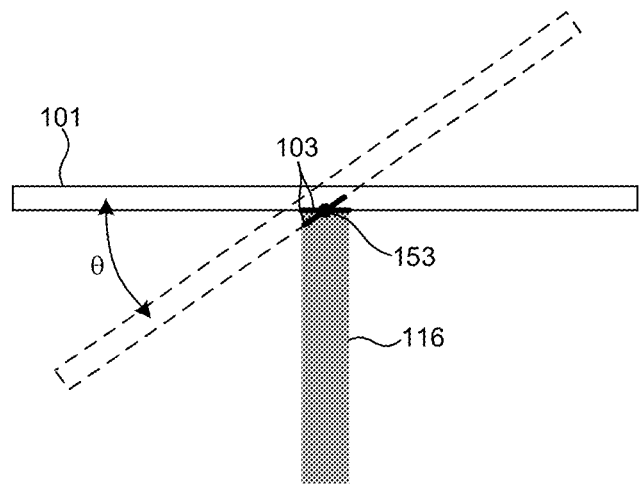
FIG. 22A depicts a top view of the illumination beam incident on the wafer as depicted in FIG. 21 where the rotational axis 153 intersects the illumination beam at the point of incidence of illumination beam with the wafer.

FIG. 22A depicts a top view of illumination beam 116 incident on wafer 101 as depicted in FIG. 21. FIG. 22A depicts an end view of rotational axis 153 in a state of alignment where rotational axis 153 intersects the illumination beam 116 at the point of incidence of illumination beam 116 with wafer 101 at location 103 on wafer 101. As depicted in FIG. 22A, as wafer 101 is rotated about rotational axis 153 over a large angle of incidence, θ, illumination beam 116 remains incident at location 103. Thus, in this scenario, the location of incidence of illumination beam 116 on the surface of wafer 101 remains stationary during measurements over a large range of angles of incidence.

Figure 22B:
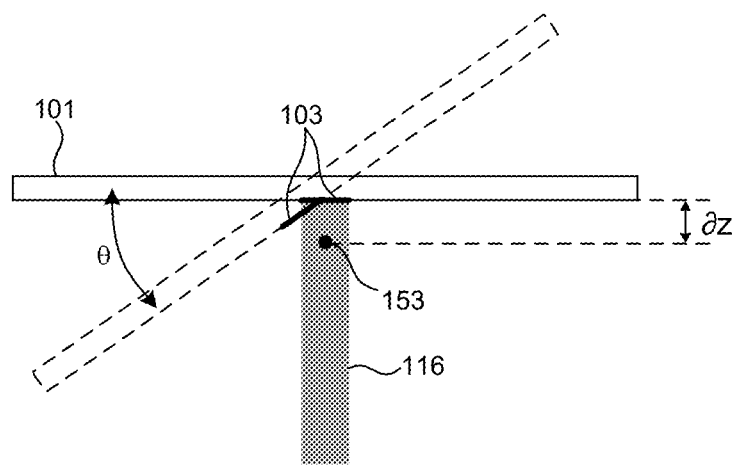
FIG. 22B depicts a top view of illumination beam incident on the wafer as depicted in FIG. 21 where rotational axis 153 is misaligned with the surface of the wafer in the Z-direction.

FIG. 22B depicts a top view of illumination beam 116 incident on wafer 101 as depicted in FIG. 21. FIG. 22B depicts an end view of rotational axis 153 in a state of alignment where rotational axis 153 is misaligned with the surface of wafer 101 by a distance ∂z. As depicted in FIG. 22B, as wafer 101 is rotated about rotational axis 153 over a large angle of incidence, θ, a portion of location 103 is no longer illuminated (i.e., some other portion of wafer 101 is illuminated instead). Thus, in this scenario, the location of incidence of illumination beam 116 on the surface of wafer 101 drifts during measurements over a large range of angles of incidence, which is highly undesirable.

Figure 22C:
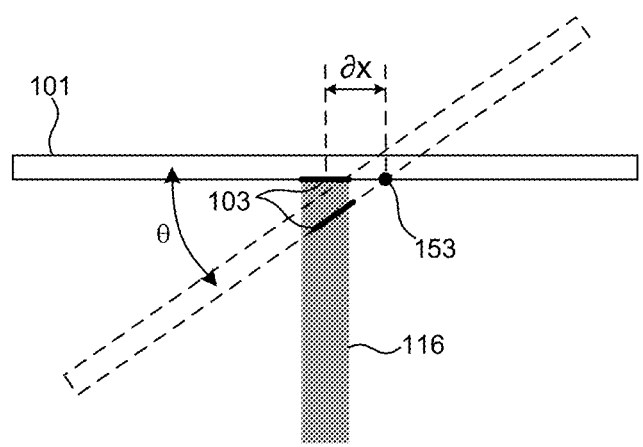
FIG. 22C depicts a top view of illumination beam incident on the wafer as depicted in FIG. 21 where rotational axis 153 is misaligned with the surface of the wafer in the X-direction.

FIG. 22C depicts a top view of illumination beam 116 incident on wafer 101 as depicted in FIG. 21. FIG. 22C depicts an end view of rotational axis 153 in a state of alignment where rotational axis 153 is co-planar with the surface of wafer 101, but is offset from illumination beam 116 by a distance ∂x. As depicted in FIG. 22C, as wafer 101 is rotated about rotational axis 153 over a large angle of incidence, θ, a portion of location 103 is no longer illuminated (i.e., some other portion of wafer 101 is illuminated instead. Thus, in this scenario, the location of incidence of illumination beam 116 on the surface of wafer 101 drifts during measurements over a large range of angles of incidence, which is highly undesirable.

In some embodiments, the calibration of the axis of rotation of the stage reference frame is achieved by aligning the center of the illumination beam with the multilayer target 152 and measuring flux at a plurality of different rotational positions of the stage reference frame, θ.

In general, transmitted flux may be measured at different angles of incidence to determine values of displacements required to align the axis of rotation 153 with the multilayer target 152 in the X and Z directions.

In another further aspect, computing system 130 is configured to generate a structural model (e.g., geometric model, material model, or combined geometric and material model) of a measured structure of a specimen, generate a T-SAXS response model that includes at least one geometric parameter from the structural model, and resolve at least one specimen parameter value by performing a fitting analysis of T-SAXS measurement data with the T-SAXS response model. The analysis engine is used to compare the simulated T-SAXS signals with measured data thereby allowing the determination of geometric as well as material properties such as electron density of the sample. In the embodiment depicted in FIG. 1, computing system 130 is configured as a model building and analysis engine configured to implement model building and analysis functionality as described herein.

Figure 24:
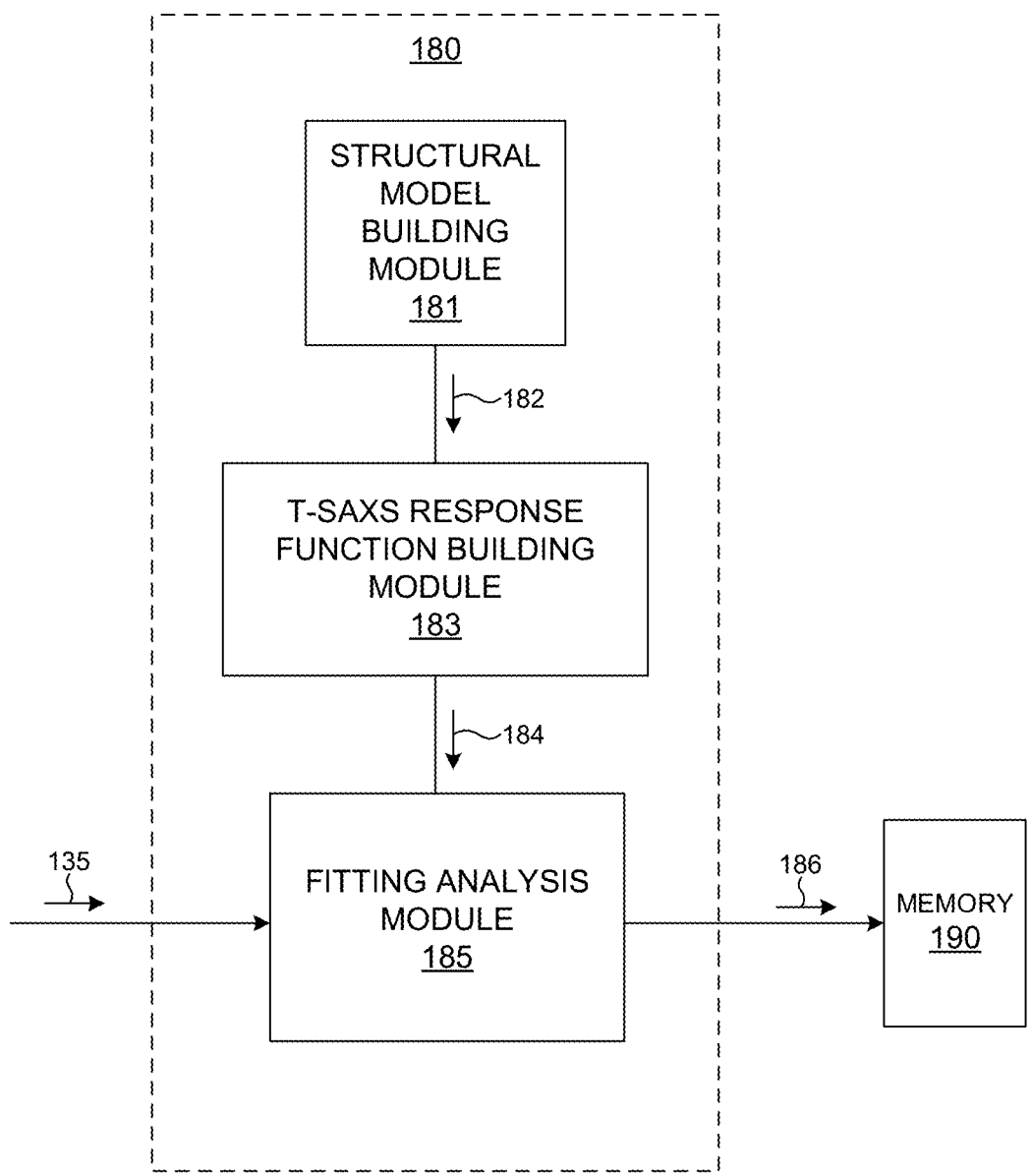
FIG. 24 is a diagram illustrative of a model building and analysis engine 180 configured to resolve specimen parameter values based on X-ray scatterometry data.

FIG. 24 is a diagram illustrative of an exemplary model building and analysis engine 180 implemented by computing system 130. As depicted in FIG. 24, model building and analysis engine 180 includes a structural model building module 181 that generates a structural model 182 of a measured structure of a specimen. In some embodiments, structural model 182 also includes material properties of the specimen. The structural model 182 is received as input to T-SAXS response function building module 183. T-SAXS response function building module 183 generates a T-SAXS response function model 184 based at least in part on the structural model 182. In some examples, the T-SAXS response function model 184 is based on X-ray form factors, $$F(\vec{q}) = \int p(\vec{r}) e^{-i\vec{q} \cdot \vec{r}} d\vec{r} \quad (1)$$

where F is the form factor, q is the scattering vector, and $\rho(r)$ is the electron density of the specimen in spherical coordinates. The X-ray scattering intensity is then given by $$I(\vec{q}) = F^*F. \quad (2)$$

T-SAXS response function model 184 is received as input to fitting analysis module 185. The fitting analysis module 185 compares the modeled T-SAXS response with the corresponding measured data to determine geometric as well as material properties of the specimen.

In some examples, the fitting of modeled data to experimental data is achieved by minimizing a chi-squared value. For example, for T-SAXS measurements, a chi-squared value can be defined as $$\chi^2_{SAXS} = \frac{1}{N_{SAXS}} \sum_j^{N_{SAXS}} \frac{(S_j^{SAXS\ model}(v_1, \ldots, v_L) - S_j^{SAXS\ experiment})^2}{\sigma^2_{SAXS,j}} \quad (3)$$

Where, $S_j^{SAXS\ experiment}$ is the measured T-SAXS signals 126 in the "channel" j, where the index j describes a set of system parameters such as diffraction order, energy, angular coordinate, etc. $S_j^{SAXS\ model}(v_1, \ldots, v_L)$ is the modeled T-SAXS signal $S_j$ for the "channel" j, evaluated for a set of structure (target) parameters $v_1, \ldots, v_L$, where these parameters describe geometric (CD, sidewall angle, overlay, etc.) and material (electron density, etc.). $\sigma_{SAXS,j}$ is the uncertainty associated with the jth channel. $N_{SAXS}$ is the total number of channels in the X-ray metrology. L is the number of parameters characterizing the metrology target.

Equation (3) assumes that the uncertainties associated with different channels are uncorrelated. In examples where the uncertainties associated with the different channels are correlated, a covariance between the uncertainties, can be calculated. In these examples a chi-squared value for T-SAXS measurements can be expressed as $$\chi^2_{SAXS} = \frac{1}{N_{SAXS}} (\vec{S}_j^{SAXS.\ model}(v_1, \ldots, v_M) - \vec{S}_j^{SAXS.\ experiment})^T \quad (4)$$
$$V_{SAXS}^{-1} (\vec{S}_j^{SAXS.\ model}(v_1, \ldots, v_M) - \vec{S}_j^{SAXS.\ experiment})$$

where, $V_{SAXS}$ is the covariance matrix of the SAXS channel uncertainties, and T denotes the transpose.

In some examples, fitting analysis module 185 resolves at least one specimen parameter value by performing a fitting analysis on T-SAXS measurement data 135 with the T-SAXS response model 184. In some examples, $\chi^2_{SAXS}$ is optimized.

As described hereinbefore, the fitting of T-SAXS data is achieved by minimization of chi-squared values. However, in general, the fitting of T-SAXS data may be achieved by other functions.

The fitting of T-SAXS metrology data is advantageous for any type of T-SAXS technology that provides sensitivity to geometric and/or material parameters of interest. Specimen parameters can be deterministic (e.g., CD, SWA, etc.) or statistical (e.g., rms height of sidewall roughness, roughness correlation length, etc.) as long as proper models describing T-SAXS beam interaction with the specimen are used.

In general, computing system 130 is configured to access model parameters in real-time, employing Real Time Critical Dimensioning (RTCD), or it may access libraries of pre-computed models for determining a value of at least one specimen parameter value associated with the specimen 101. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference.

In some examples, model building and analysis engine 180 improves the accuracy of measured parameters by any combination of feed sideways analysis, feed forward analysis, and parallel analysis. Feed sideways analysis refers to taking multiple data sets on different areas of the same specimen and passing common parameters determined from the first dataset onto the second dataset for analysis. Feed forward analysis refers to taking data sets on different specimens and passing common parameters forward to subsequent analyses using a stepwise copy exact parameter feed forward approach. Parallel analysis refers to the parallel or concurrent application of a non-linear fitting methodology to multiple datasets where at least one common parameter is coupled during the fitting.

Multiple tool and structure analysis refers to a feed forward, feed sideways, or parallel analysis based on regression, a look-up table (i.e., "library" matching), or another fitting procedure of multiple datasets. Exemplary methods and systems for multiple tool and structure analysis is described in U.S. Pat. No. 7,478,019, issued on Jan. 13, 2009, to KLA-Tencor Corp., the entirety of which is incorporated herein by reference.

In another further aspect, an initial estimate of values of one or more parameters of interest is determined based on T-SAXS measurements performed at a single orientation of the incident X-ray beam with respect to the measurement target. The initial, estimated values are implemented as the starting values of the parameters of interest for a regression of the measurement model with measurement data collected from T-SAXS measurements at multiple orientations. In this manner, a close estimate of a parameter of interest is determined with a relatively small amount of computational effort, and by implementing this close estimate as the starting point for a regression over a much larger data set, a refined estimate of the parameter of interest is obtained with less overall computational effort.

In another aspect, metrology tool 100 includes a computing system (e.g., computing system 130) configured to implement beam control functionality as described herein. In the embodiment depicted in FIG. 1, computing system 130 is configured as a beam controller operable to control any of the illumination properties such as intensity, divergence, spot size, polarization, spectrum, and positioning of the incident illumination beam 116.

As illustrated in FIG. 17, computing system 130 is communicatively coupled to detector 119. Computing system 130 is configured to receive measurement data 135 from detector 119. In one example, measurement data 135 includes an indication of the measured response of the specimen (i.e., intensities of the diffraction orders). Based on the distribution of the measured response on the surface of detector 119, the location and area of incidence of illumination beam 116 on specimen 101 is determined by computing system 130. In one example, pattern recognition techniques are applied by computing system 130 to determine the location and area of incidence of illumination beam 116 on specimen 101 based on measurement data 135. In some examples, computing system 130 communicates command signals 137 to X-ray illumination source 110 to select the desired illumination wavelength. In some examples, computing system 130 communicates command signals 138 to actuator subsystem 111' to redirect the X-ray emission relative to base frame 141 to achieve a desired beam direction. In some examples, computing system 130 communicates command signals 136 to beam shaping slit mechanism 120 to change the beam spot size such that incident illumination beam 116 arrives at specimen 101 with the desired beam spot size and orientation. In one example, command signals 136 cause rotary actuator 122, depicted in FIG. 21, to rotate beam shaping slit mechanism 120 to a desired orientation with respect to specimen 101. In another example, command signals 136 cause actuators associated with each of slits 126-129 to change position to reshape the incident beam 116 to a desired shape and size. In some other examples, computing system 130 communicates a command signal to wafer positioning system 140 to position and orient specimen 101 such that incident illumination beam 116 arrives at the desired location and angular orientation with respect to specimen 101.

In a further aspect, T-SAXS measurement data is used to generate an image of a measured structure based on the measured intensities of the detected diffraction orders. In some embodiments, a T-SAXS response function model is generalized to describe the scattering from a generic electron density mesh. Matching this model to the measured signals, while constraining the modelled electron densities in this mesh to enforce continuity and sparse edges, provides a three dimensional image of the sample.

Although, geometric, model-based, parametric inversion is preferred for critical dimension (CD) metrology based on T-SAXS measurements, a map of the specimen generated from the same T-SAXS measurement data is useful to identify and correct model errors when the measured specimen deviates from the assumptions of the geometric model.

In some examples, the image is compared to structural characteristics estimated by a geometric, model-based parametric inversion of the same scatterometry measurement data. Discrepancies are used to update the geometric model of the measured structure and improve measurement performance. The ability to converge on an accurate parametric measurement model is particularly important when measuring integrated circuits to control, monitor, and trouble-shoot their manufacturing process.

In some examples, the image is a two dimensional (2-D) map of electron density, absorptivity, complex index of refraction, or a combination of these material characteristics. In some examples, the image is a three dimensional (3-D) map of electron density, absorptivity, complex index of refraction, or a combination of these material characteristics. The map is generated using relatively few physical constraints. In some examples, one or more parameters of interest, such as critical dimension (CD), sidewall angle (SWA), overlay, edge placement error, pitch walk, etc., are estimated directly from the resulting map. In some other examples, the map is useful for debugging the wafer process when the sample geometry or materials deviate outside the range of expected values contemplated by a parametric structural model employed for model-based CD measurement. In one example, the differences between the map and a rendering of the structure predicted by the parametric structural model according to its measured parameters are used to update the parametric structural model and improve its measurement performance. Further details are described in U.S. Patent Publication No. 2015/0300965, the content of which is incorporated herein by reference it its entirety. Additional details are described in U.S. Patent Publication No. 2015/0117610, the content of which is incorporated herein by reference it its entirety.

In a further aspect, model building and analysis engine 180 is employed to generate models for combined X-ray and optical measurement analysis. In some examples, optical simulations are based on, e.g., rigorous coupled-wave analysis (RCWA) where Maxwell's equations are solved to calculate optical signals such as reflectivities for different polarizations, ellipsometric parameters, phase change, etc.

Values of one or more parameters of interest are determined based on a combined fitting analysis of the detected intensities of the X-ray diffraction orders at the plurality of different angles of incidence and detected optical intensities with a combined, geometrically parameterized response model. The optical intensities are measured by an optical metrology tool that may or may not be mechanically integrated with an X-ray metrology system, such as systems 100 depicted in FIG. 17. Further details are described in U.S. Patent Publication No. 2014/0019097 and U.S. Patent Publication No. 2013/0304424, the contents of each are incorporated herein by reference it their entirety.

In general, a metrology target is characterized by an aspect ratio defined as a maximum height dimension (i.e., dimension normal to the wafer surface) divided by a maximum lateral extent dimension (i.e., dimension aligned with the wafer surface) of the metrology target. In some embodiments, the metrology target under measurement has an aspect ratio of at least twenty. In some embodiments, the metrology target has an aspect ratio of at least forty.

It should be recognized that the various steps described throughout the present disclosure may be carried out by a single computer system 130 or, alternatively, a multiple computer system 130. Moreover, different subsystems of the system 100, such as the specimen positioning system 140, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the X-ray illumination source 110, beam shaping slit mechanism 120, specimen positioning system 140, and detector 119 in any manner known in the art. For example, the one or more computing systems 130 may be coupled to computing systems associated with the X-ray illumination source 110, beam shaping slit mechanism 120, specimen positioning system 140, and detector 119, respectively. In another example, any of the X-ray illumination source 110, beam shaping slit mechanism 120, specimen positioning system 140, and detector 119 may be controlled directly by a single computer system coupled to computer system 130.

The computer system 130 may be configured to receive and/or acquire data or information from the subsystems of the system (e.g., X-ray illumination source 110, beam shaping slit mechanism 120, specimen positioning system 140, detector 119, and the like) by a transmission medium that may include wireline and/or wireless portions. In this manner, the transmission medium may serve as a data link between the computer system 130 and other subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., signals 135) from a storage medium (i.e., memory 132 or 190) via a data link. For instance, spectral results obtained using detector 119 may be stored in a permanent or semi-permanent memory device (e.g., memory 132 or 190). In this regard, the measurement results may be imported from on-board memory or from an external memory system. Moreover, the computer system 130 may send data to other systems via a transmission medium. For instance, specimen parameter values 186 determined by computer system 130 may be stored in a permanent or semi-permanent memory device (e.g., memory 190). In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

Figure 25:
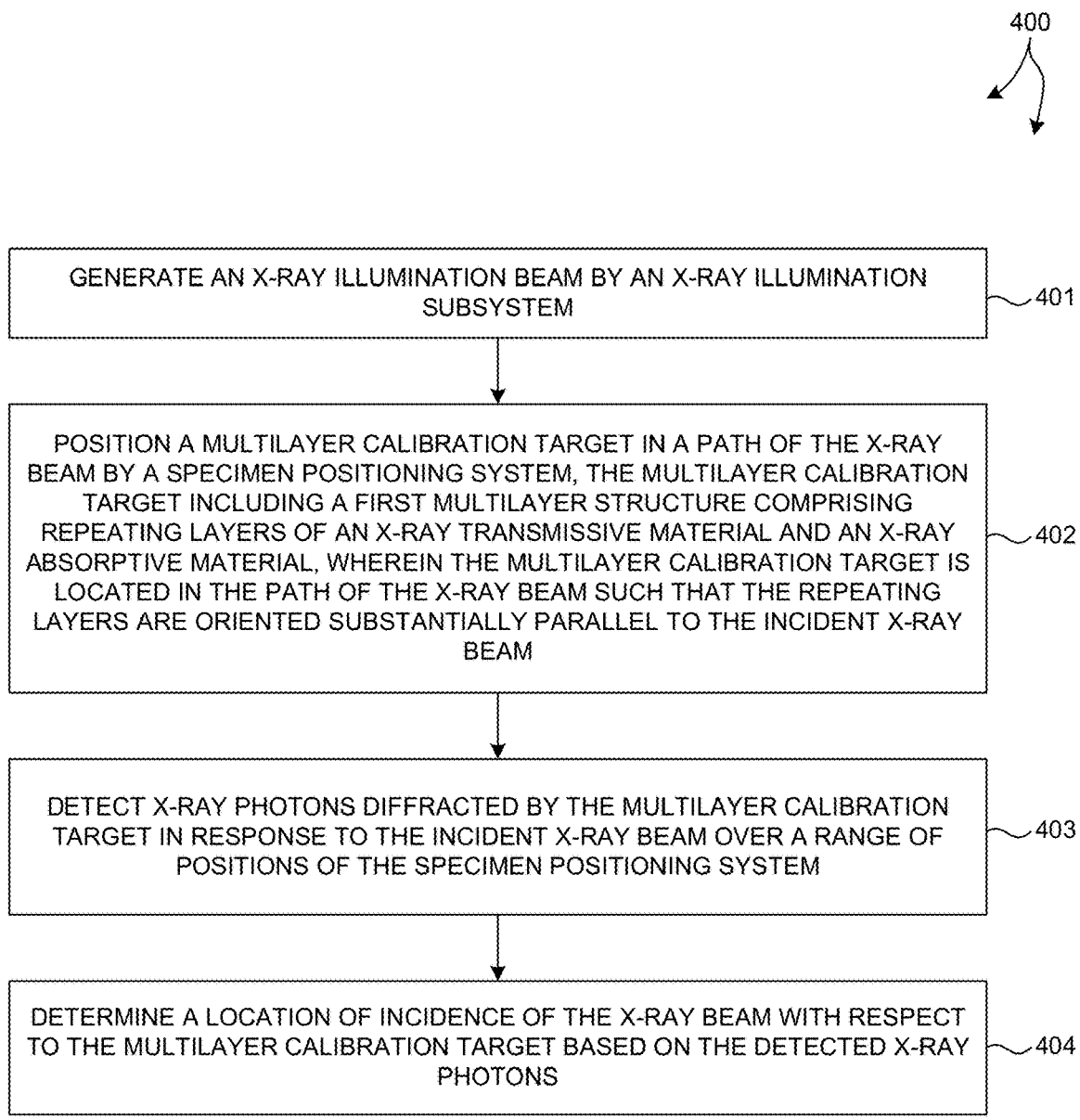
FIG. 25 is a flowchart illustrative of an exemplary method of calibrating an X-ray based scatterometry system with a multilayer calibration target as described herein.

FIG. 25 illustrates a flowchart of a method 400 suitable for implementation by the metrology system 100 of the present invention. In one aspect, it is recognized that data processing blocks of method 400 may be carried out via a pre-programmed algorithm executed by one or more processors of computing system 130. While the following description is presented in the context of metrology system 100, it is recognized herein that the particular structural aspects of metrology system 100 do not represent limitations and should be interpreted as illustrative only.

In block 401, an X-ray illumination beam is generated by an X-ray illumination subsystem.

In block 402, a multilayer calibration target is positioned in a path of the X-ray beam by a specimen positioning system. The multilayer calibration target includes a first multilayer structure including repeating layers of an X-ray transmissive material and an X-ray absorptive material. The multilayer calibration target is located in the path of the X-ray beam such that the repeating layers are oriented substantially parallel to the incident X-ray beam.

In block 403, X-ray photons diffracted by the multilayer calibration target in response to the incident X-ray beam are detected over a range of positions of the specimen positioning system.

In block 404, a location of incidence of the X-ray beam with respect to the multilayer calibration target is determined based on the detected diffracted X-ray photons.

In some embodiments, scatterometry measurements as described herein are implemented as part of a fabrication process tool. Examples of fabrication process tools include, but are not limited to, lithographic exposure tools, film deposition tools, implant tools, and etch tools. In this manner, the results of a T-SAXS analysis are used to control a fabrication process. In one example, T-SAXS measurement data collected from one or more targets is sent to a fabrication process tool. The T-SAXS measurement data is analyzed as described herein and the results used to adjust the operation of the fabrication process tool.

Scatterometry measurements as described herein may be used to determine characteristics of a variety of semiconductor structures. Exemplary structures include, but are not limited to, FinFETs, low-dimensional structures such as nanowires or graphene, sub 10 nm structures, lithographic structures, through substrate vias (TSVs), memory structures such as DRAM, DRAM 4F2, FLASH, MRAM and high aspect ratio memory structures. Exemplary structural characteristics include, but are not limited to, geometric parameters such as line edge roughness, line width roughness, pore size, pore density, side wall angle, profile, critical dimension, pitch, thickness, overlay, and material parameters such as electron density, composition, grain structure, morphology, stress, strain, and elemental identification. In some embodiments, the metrology target is a periodic structure. In some other embodiments, the metrology target is aperiodic.

In some examples, measurements of critical dimensions, thicknesses, overlay, and material properties of high aspect ratio semiconductor structures including, but not limited to, spin transfer torque random access memory (STT-RAM), three dimensional NAND memory (3D-NAND) or vertical NAND memory (V-NAND), dynamic random access memory (DRAM), three dimensional FLASH memory (3D-FLASH), resistive random access memory (Re-RAM), and phase change random access memory (PC-RAM) are performed with T-SAXS measurement systems as described herein.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement. As described herein, the term "metrology system" includes any system employed at least in part to characterize a specimen in any aspect, including critical dimension applications and overlay metrology applications. However, such terms of art do not limit the scope of the term "metrology system" as described herein. In addition, the metrology systems described herein may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the measurement techniques described herein.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, XRF disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An X-ray based measurement system comprising:
an X-ray illumination subsystem configured to generate an X-ray beam;
a specimen positioning system configured to position a specimen with respect to the X-ray beam such that the X-ray beam is incident on the surface of the specimen at any location on the surface of the specimen;
a multilayer calibration target disposed on the specimen positioning system, the multilayer calibration target including a first multilayer structure comprising repeating layers of an X-ray transmissive material and an X-ray absorptive material, wherein the multilayer calibration target is located in a path of the X-ray beam such that the repeating layers are oriented substantially parallel to the incident X-ray beam;

an X-ray detector configured to detect X-ray photons diffracted by the multilayer calibration target in response to the incident X-ray beam over a range of positions of the specimen positioning system; and a computing system configured to determine a location of incidence of the X-ray beam with respect to the multilayer calibration target based on the detected X-ray photons.

2. The X-ray based measurement system of claim 1, wherein the range of positions includes a range of angles of incidence, and wherein the computing system is further configured to determine an orientation of the X-ray beam with respect to the multilayer calibration target based on the detected X-ray photons.

3. The X-ray based measurement system of claim 1, wherein the specimen positioning system is configured to rotate the specimen with respect to the X-ray beam about an axis of rotation such that the X-ray beam is incident on the surface of the specimen at any location at a plurality of angles of incidence, and wherein the computing system is further configured to determine a misalignment between a position of the axis of rotation with respect to the X-ray beam based on the detected X-ray photons.

4. The X-ray based measurement system of claim 1, the computing system further configured to:
estimate a distance between the multilayer target and the detector based on a spatial separation at the detector between detected X-ray photons diffracted into two different orders.

5. The X-ray based measurement system of claim 1, the multilayer calibration target further comprising:
a second multilayer structure comprising repeating layers of an X-ray transmissive material and an X-ray absorptive material, the second multilayer structure disposed adjacent the first multilayer structure along a direction aligned with the incident X-ray beam, wherein the repeating layers of the second multilayer structure are oriented substantially parallel to the incident X-ray beam, and wherein the repeating layers of the first multilayer structure are oriented at a different angle with respect to an axis of the incident X-ray beam than the repeating layers of the second multilayer structure.

6. The X-ray based measurement system of claim 1, the multilayer calibration target further comprising:
a second multilayer structure comprising repeating layers of the X-ray transmissive material and the X-ray absorptive material, the second multilayer structure disposed adjacent the first multilayer structure along a direction perpendicular to an axis of the incident X-ray beam.

7. The X-ray based measurement system of claim 6, wherein the repeating layers of the second multilayer structure are oriented substantially parallel to the incident X-ray beam, and wherein the repeating layers of the first multilayer structure are oriented at a different angle with respect to an axis perpendicular to a longitudinal axis of the incident X-ray beam than the repeating layers of the second multilayer structure.

8. The X-ray based measurement system of claim 6, wherein the repeating layers of the second multilayer structure are oriented substantially parallel to the incident X-ray beam, and wherein the first multilayer structure is spatially separated from the second multilayer structure by a gap distance along the direction perpendicular to an axis of the incident X-ray beam.

9. The X-ray based measurement system of claim 8, the computing system configured to measure an amount of photon contamination outside the gap between the first and second multilayer structures based on the detected X-ray photons.

10. The X-ray based measurement system of claim 8, the computing system configured to measure an amount of photon flux passed through the gap between the first and second multilayer structures based on the detected X-ray photons.

11. The X-ray based measurement system of claim 1, the multilayer calibration target further comprising:
one or more optical fiducial marks located on a surface of the multilayer calibration target.

12. The X-ray based measurement system of claim 11, further comprising:
an alignment camera that generates an image of at least a portion of the one or more fiducial marks, wherein the computing system is further configured to locate the one or more fiducial marks in the coordinate system of the specimen positioning system based on the image and estimate a location of incidence of the X-ray beam in the coordinate system of the specimen positioning system based on the location of the one or more fiducial marks and a known distance between the one or more fiducial marks and the multilayer calibration target.

13. The X-ray based measurement system of claim 1, wherein a depth of the first multilayer structure in a direction aligned with the incident X-ray beam is at least three micrometers.

14. A method comprising:
generating an X-ray illumination beam by an X-ray illumination subsystem;
positioning a multilayer calibration target in a path of the X-ray beam by a specimen positioning system, the multilayer calibration target including a first multilayer structure comprising repeating layers of an X-ray transmissive material and an X-ray absorptive material, wherein the multilayer calibration target is located in the path of the X-ray beam such that the repeating layers are oriented substantially parallel to the incident X-ray beam;
detecting X-ray photons diffracted by the multilayer calibration target in response to the incident X-ray beam over a range of positions of the specimen positioning system; and
determining a location of incidence of the X-ray beam with respect to the multilayer calibration target based on the detected X-ray photons.

15. The method of claim 14, further comprising:
estimating a distance between the multilayer target and the detector based on a spatial separation at the detector between detected X-ray photons diffracted into different orders.

16. The method of claim 14, wherein the multilayer calibration target also includes a second multilayer structure comprising repeating layers of an X-ray transmissive material and an X-ray absorptive material, the second multilayer structure disposed adjacent the first multilayer structure along a direction aligned with the incident X-ray beam, wherein the repeating layers of the second multilayer structure are oriented substantially parallel to the incident X-ray beam, and wherein the repeating layers of the first multilayer structure are oriented at a different angle with respect to an axis perpendicular to a longitudinal axis of the incident X-ray beam than the repeating layers of the second multilayer structure.

17. The method of claim 14, wherein the multilayer calibration target also includes a second multilayer structure comprising repeating layers of the X-ray transmissive material and the X-ray absorptive material, the second multilayer structure disposed adjacent the first multilayer structure along a direction perpendicular to an axis of the incident X-ray beam.

18. The method of claim 17, wherein the repeating layers of the second multilayer structure are oriented substantially parallel to the incident X-ray beam, and wherein the repeating layers of the first multilayer structure are oriented at a different angle with respect to an axis of the incident X-ray beam than the repeating layers of the second multilayer structure.

19. The method of claim 17, wherein the repeating layers of the second multilayer structure are oriented substantially parallel to the incident X-ray beam, and wherein the first multilayer structure is spatially separated from the second multilayer structure by a gap distance along the direction perpendicular to an axis of the incident X-ray beam.

20. The method of claim 19, further comprising:
measuring an amount of photon contamination outside the gap between the first and second multilayer structures based on the detected X-ray photons.

21. The method of claim 19, further comprising:
measuring an amount of photon flux passed through the gap between the first and second multilayer structures based on the detected X-ray photons.

22. A multilayer calibration target, comprising:
a first multilayer structure comprising alternating, repeating layers of an X-ray transmissive and an X-ray absorptive material, the repeating layers having substantially the same thickness, the multilayer calibration target mounted to a specimen positioning system of an X-ray based measurement system, the multilayer structure located in the path of the X-ray beam such that the repeating layers are oriented substantially parallel to the incident X-ray beam, and wherein a location of incidence of the X-ray beam with respect to the multilayer calibration target is determined based on detected X-ray photons diffracted by the multilayer calibration target in response to the incident X-ray beam.

23. The multilayer calibration target of claim 22, wherein a depth of the first multilayer structure in a direction aligned with the incident X-ray beam is at least three micrometers.

24. The multilayer calibration target of claim 22, further comprising:
one or more optical fiducial marks located on a surface of the multilayer calibration target.

25. The multilayer calibration target of claim 22, further comprising:
a second multilayer structure comprising repeating layers of an X-ray transmissive material and an X-ray absorptive material, the second multilayer structure disposed adjacent the first multilayer structure along a direction aligned with the incident X-ray beam, wherein the repeating layers of the second multilayer structure are oriented substantially parallel to the incident X-ray beam, and wherein the repeating layers of the first multilayer structure are oriented at a different angle with respect to an axis perpendicular to a longitudinal axis of the incident X-ray beam than the repeating layers of the second multilayer structure.

26. The multilayer calibration target of claim 22, further comprising:
a second multilayer structure comprising repeating layers of a X-ray transmissive material and a X-ray absorptive material, the second multilayer structure disposed adjacent the first multilayer structure along a direction perpendicular to an axis of the incident X-ray beam.

27. The multilayer calibration target of claim 26, wherein the repeating layers of the second multilayer structure are oriented substantially parallel to the incident X-ray beam, and wherein the repeating layers of the first multilayer structure are oriented at a different angle with respect to an axis perpendicular to a longitudinal axis of the incident X-ray beam than the repeating layers of the second multilayer structure.

28. The multilayer calibration target of claim 26, wherein the repeating layers of the second multilayer structure are oriented substantially parallel to the incident X-ray beam, and wherein the first multilayer structure is spatially separated from the second multilayer structure by a gap distance along the direction perpendicular to a longitudinal axis of the incident X-ray beam.

* * * * *